US008521313B2

(12) United States Patent
Oh et al.

(10) Patent No.: US 8,521,313 B2
(45) Date of Patent: Aug. 27, 2013

(54) METHOD AND APPARATUS FOR PROCESSING A MEDIA SIGNAL

(75) Inventors: Hyen O Oh, Gyeonggi-do (KR); Hee Suk Pang, Seoul (KR); Dong Soo Kim, Seoul (KR); Jae Hyun Lim, Seoul (KR); Yang-Won Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 966 days.

(21) Appl. No.: 12/161,329

(22) PCT Filed: Jan. 19, 2007

(86) PCT No.: PCT/KR2007/000342

§ 371 (c)(1),
(2), (4) Date: Jul. 17, 2008

(87) PCT Pub. No.: WO2007/083953

PCT Pub. Date: Jul. 26, 2007

(65) Prior Publication Data

US 2008/0279388 A1 Nov. 13, 2008

Related U.S. Application Data

(60) Provisional application No. 60/759,980, filed on Jan. 19, 2006, provisional application No. 60/776,724, filed on Feb. 27, 2006, provisional application No. 60/779,441, filed on Mar. 7, 2006, provisional application No. 60/779,417, filed on Mar. 7, 2006, provisional application No. 60/779,442, filed on Mar. 7, 2006, provisional application No. 60/787,172, filed on Mar. 30, 2006, provisional application No. 60/787,516, filed on Mar. 31, 2006.

(51) Int. Cl.
*G06F 17/00* (2006.01)
*H04R 5/00* (2006.01)

(52) U.S. Cl.
USPC .................. 700/94; 381/18; 381/19; 381/20; 381/22; 381/23

(58) Field of Classification Search
USPC ................................ 381/2, 18, 19, 20, 22, 23
See application file for complete search history.

(56) References Cited

U.S. PATENT DOCUMENTS 5,166,685 A 11/1992 Campbell et al.
5,524,054 A 6/1996 Spille et al.

(Continued)

FOREIGN PATENT DOCUMENTS

CN 1223064 7/1999
CN 1253464 5/2000

(Continued)

OTHER PUBLICATIONS

Pasi, Ojala, "New use cases for spatial audio coding," ITU Study Group 16—Video Coding Experts Group—ISO/IEG MPEG & ITU-T VCEG (ISO/IEC JTC1/SC29/WG11 and ITU-T SG16 Q6), XX, XX, No. M12913; XP030041582 (Jan. 11, 2006).

(Continued)

*Primary Examiner* — S. V. Clark
*Assistant Examiner* — Jesse Y Miyoshi
(74) *Attorney, Agent, or Firm* — Fish & Richardson P.C.

(57) ABSTRACT

An apparatus for processing a media signal and method thereof are disclosed, by which the media signal can be converted to a surround signal to a surround signal by using spatial information of the media signal. The present invention provides a method of processing a signal, the method comprising of generating source mapping information corresponding to each source of multi-sources by using spatial information indicating features between the multi-sources; generating at least one rendering information by using the source mapping information and filter information having a surround effect; and performing interpolation by using neighbor rendering information of the at least one rendering information.

13 Claims, 15 Drawing Sheets

(56) References Cited

U.S. PATENT DOCUMENTS

| | | | |
|---|---|---|---|
| 5,561,736 | A | 10/1996 | Moore et al. |
| 5,579,396 | A | 11/1996 | Iida et al. |
| 5,632,005 | A | 5/1997 | Davis et al. |
| 5,668,924 | A | 9/1997 | Takahashi |
| 5,703,584 | A | 12/1997 | Hill et al. |
| 5,862,227 | A | 1/1999 | Orduna et al. |
| 6,072,877 | A | 6/2000 | Abel |
| 6,081,783 | A | 6/2000 | Divine et al. |
| 6,118,875 | A | 9/2000 | Moller |
| 6,226,616 | B1 | 5/2001 | You et al. |
| 6,307,941 | B1 | 10/2001 | Tanner et al. |
| 6,466,913 | B1 | 10/2002 | Yasuda et al. |
| 6,504,496 | B1 | 1/2003 | Mesarovic et al. |
| 6,574,339 | B1 | 6/2003 | Kim et al. |
| 6,611,212 | B1 | 8/2003 | Craven et al. |
| 6,633,648 | B1 | 10/2003 | Bauck |
| 6,711,266 | B1 | 3/2004 | Aylward et al. |
| 6,721,425 | B1 | 4/2004 | Aylward |
| 6,795,556 | B1 | 9/2004 | Sibbald et al. |
| 6,973,130 | B1 | 12/2005 | Wee et al. |
| 7,085,393 | B1 | 8/2006 | Chen |
| 7,177,431 | B2 | 2/2007 | Davis et al. |
| 7,180,964 | B2 | 2/2007 | Borowski et al. |
| 7,260,540 | B2 | 8/2007 | Mayasaka et al. |
| 7,302,068 | B2 | 11/2007 | Longbottom et al. |
| 7,391,877 | B1 | 6/2008 | Brungart |
| 7,519,530 | B2 * | 4/2009 | Kaajas et al. ................. 704/205 |
| 7,519,538 | B2 | 4/2009 | Villemoes et al. |
| 7,536,021 | B2 | 5/2009 | Dickins et al. |
| 7,555,434 | B2 | 6/2009 | Nomura et al. |
| 7,613,306 | B2 | 11/2009 | Miyasaka et al. |
| 7,720,230 | B2 | 5/2010 | Allamanche et al. |
| 7,761,304 | B2 | 7/2010 | Faller |
| 7,773,756 | B2 | 8/2010 | Beard |
| 7,787,631 | B2 | 8/2010 | Faller |
| 7,797,163 | B2 | 9/2010 | Pang et al. |
| 7,880,748 | B1 | 2/2011 | Sevigny |
| 7,916,873 | B2 | 3/2011 | Villemoes et al. |
| 7,961,889 | B2 | 6/2011 | Kim et al. |
| 7,979,282 | B2 | 7/2011 | Kim et al. |
| 7,987,096 | B2 | 7/2011 | Kim et al. |
| 8,081,762 | B2 | 12/2011 | Ojala et al. |
| 8,081,764 | B2 | 12/2011 | Takagi et al. |
| 8,108,220 | B2 | 1/2012 | Saunders et al. |
| 8,116,459 | B2 | 2/2012 | Disch et al. |
| 8,150,042 | B2 | 4/2012 | Van Loon et al. |
| 8,150,066 | B2 | 4/2012 | Kubo |
| 8,185,403 | B2 | 5/2012 | Pang et al. |
| 8,189,682 | B2 | 5/2012 | Yamasaki |
| 8,255,211 | B2 | 8/2012 | Vinton et al. |
| 2001/0031062 | A1 | 10/2001 | Terai et al. |
| 2003/0007648 | A1 | 1/2003 | Currell |
| 2003/0035553 | A1 | 2/2003 | Baumgarte et al. |
| 2003/0182423 | A1 | 9/2003 | Shafir et al. |
| 2003/0236583 | A1 | 12/2003 | Baumgarte et al. |
| 2004/0032960 | A1 | 2/2004 | Griesinger |
| 2004/0049379 | A1 | 3/2004 | Thumpudi et al. |
| 2004/0071445 | A1 | 4/2004 | Tarnoff et al. |
| 2004/0111171 | A1 | 6/2004 | Jang et al. |
| 2004/0118195 | A1 | 6/2004 | Nespo et al. |
| 2004/0138874 | A1 | 7/2004 | Kaajas et al. |
| 2004/0196770 | A1 | 10/2004 | Touyama et al. |
| 2004/0196982 | A1 | 10/2004 | Aylward et al. |
| 2005/0061808 | A1 | 3/2005 | Cole et al. |
| 2005/0063613 | A1 | 3/2005 | Casey et al. |
| 2005/0074127 | A1 | 4/2005 | Herre et al. |
| 2005/0089181 | A1 | 4/2005 | Polk, Jr. |
| 2005/0117762 | A1 | 6/2005 | Sakurai et al. |
| 2005/0135643 | A1 | 6/2005 | Lee et al. |
| 2005/0157883 | A1 | 7/2005 | Herre et al. |
| 2005/0179701 | A1 | 8/2005 | Jahnke |
| 2005/0180579 | A1 | 8/2005 | Baumgarte |
| 2005/0195981 | A1 | 9/2005 | Faller et al. |
| 2005/0271367 | A1 | 12/2005 | Lee et al. |
| 2005/0273322 | A1 | 12/2005 | Lee et al. |
| 2005/0273324 | A1 | 12/2005 | Yi |
| 2005/0276430 | A1 | 12/2005 | He et al. |
| 2006/0002572 | A1 | 1/2006 | Smithers et al. |
| 2006/0004583 | A1 | 1/2006 | Herre et al. |
| 2006/0008091 | A1 | 1/2006 | Kim et al. |
| 2006/0008094 | A1 | 1/2006 | Huang et al. |
| 2006/0009225 | A1 | 1/2006 | Herre et al. |
| 2006/0050909 | A1 | 3/2006 | Kim et al. |
| 2006/0072764 | A1 | 4/2006 | Mertens et al. |
| 2006/0083394 | A1 | 4/2006 | McGrath |
| 2006/0115100 | A1 | 6/2006 | Faller et al. |
| 2006/0126851 | A1 | 6/2006 | Yuen et al. |
| 2006/0133618 | A1 | 6/2006 | Villemoes et al. |
| 2006/0153408 | A1 | 7/2006 | Faller et al. |
| 2006/0190247 | A1 | 8/2006 | Lindblom |
| 2006/0198527 | A1 | 9/2006 | Chun |
| 2006/0233379 | A1 | 10/2006 | Villemoes et al. |
| 2006/0233380 | A1 | 10/2006 | Holzer et al. |
| 2006/0239473 | A1 | 10/2006 | Kjorling et al. |
| 2006/0251276 | A1 | 11/2006 | Chen |
| 2007/0133831 | A1 | 6/2007 | Kim et al. |
| 2007/0160218 | A1 * | 7/2007 | Jakka et al. ..................... 381/22 |
| 2007/0160219 | A1 | 7/2007 | Jakka et al. |
| 2007/0162278 | A1 | 7/2007 | Miyasaka et al. |
| 2007/0165886 | A1 | 7/2007 | Topliss et al. |
| 2007/0172071 | A1 | 7/2007 | Mehrotra et al. |
| 2007/0183603 | A1 | 8/2007 | Jin et al. |
| 2007/0203697 | A1 | 8/2007 | Pang et al. |
| 2007/0219808 | A1 | 9/2007 | Herre et al. |
| 2007/0223708 | A1 | 9/2007 | Villemoes et al. |
| 2007/0223709 | A1 | 9/2007 | Kim et al. |
| 2007/0233296 | A1 | 10/2007 | Kim et al. |
| 2007/0258607 | A1 | 11/2007 | Purnhagen et al. |
| 2007/0280485 | A1 | 12/2007 | Villemoes |
| 2007/0291950 | A1 | 12/2007 | Kimura et al. |
| 2008/0002842 | A1 * | 1/2008 | Neusinger et al. ............ 381/119 |
| 2008/0008327 | A1 | 1/2008 | Ojala et al. |
| 2008/0033732 | A1 | 2/2008 | Seefeldt et al. |
| 2008/0052089 | A1 | 2/2008 | Takagi |
| 2008/0097750 | A1 | 4/2008 | Seefeldt et al. |
| 2008/0130904 | A1 | 6/2008 | Faller |
| 2008/0192941 | A1 | 8/2008 | Oh et al. |
| 2008/0195397 | A1 | 8/2008 | Myburg et al. |
| 2008/0199026 | A1 | 8/2008 | Oh et al. |
| 2008/0304670 | A1 | 12/2008 | Breebaart |
| 2009/0041265 | A1 | 2/2009 | Kubo |
| 2009/0110203 | A1 | 4/2009 | Taleb |
| 2009/0129601 | A1 | 5/2009 | Ojala et al. |

FOREIGN PATENT DOCUMENTS

| | | | |
|---|---|---|---|
| CN | 1411679 | | 4/2003 |
| CN | 1495705 | | 5/2004 |
| CN | 1655651 | | 8/2005 |
| EP | 0 637 191 | | 2/1995 |
| EP | 0857375 | | 8/1998 |
| EP | 1211857 | | 6/2002 |
| EP | 1 315 148 | | 5/2003 |
| EP | 1376538 | A1 | 1/2004 |
| EP | 1455345 | | 9/2004 |
| EP | 1 545 154 | | 6/2005 |
| EP | 1 617 413 | | 1/2006 |
| JP | 7248255 | | 9/1995 |
| JP | 08-079900 | | 3/1996 |
| JP | 8-084400 | | 3/1996 |
| JP | 9-074446 | | 3/1997 |
| JP | 09-224300 | | 8/1997 |
| JP | 9-261351 | | 10/1997 |
| JP | 09-275544 | | 10/1997 |
| JP | 10-304498 | | 11/1998 |
| JP | 11-032400 | | 2/1999 |
| JP | 11503882 | | 3/1999 |
| JP | 2001028800 | | 1/2001 |
| JP | 2001-188578 | | 7/2001 |
| JP | 2001-516537 | | 9/2001 |
| JP | 2001-359197 | | 12/2001 |
| JP | 2002-049399 | | 2/2002 |
| JP | 2003-009296 | | 1/2003 |
| JP | 2003-111198 | | 4/2003 |
| JP | 2004-078183 | | 3/2004 |

| | | | |
|---|---|---|---|
| JP | 2004-535145 | | 11/2004 |
| JP | 2005-063097 | | 3/2005 |
| JP | 2005-229612 | | 8/2005 |
| JP | 2005-523624 | | 8/2005 |
| JP | 2005-352396 | | 12/2005 |
| JP | 2006-014219 | | 1/2006 |
| JP | 2007-511140 | | 4/2007 |
| JP | 2007-288900 | | 11/2007 |
| JP | 2008-504578 | | 2/2008 |
| JP | 08-065169 | | 3/2008 |
| JP | 2008-511044 | | 4/2008 |
| JP | 08-202397 | | 9/2008 |
| KR | 10-2001-0001993 | | 1/2001 |
| KR | 10-2001-0009258 | | 2/2001 |
| KR | 2004106321 | A | 12/2004 |
| KR | 2005061808 | A | 6/2005 |
| KR | 2005063613 | A | 6/2005 |
| RU | 2119259 | | 9/1998 |
| RU | 2129336 | | 4/1999 |
| RU | 2221329 | C2 | 1/2004 |
| RU | 2004133032 | | 4/2005 |
| RU | 2005103637 | A | 7/2005 |
| RU | 2005104123 | | 7/2005 |
| TW | 263646 | | 11/1995 |
| TW | 289885 | | 11/1996 |
| TW | 503626 | | 9/2001 |
| TW | 468182 | | 12/2001 |
| TW | 550541 | | 9/2003 |
| TW | 200304120 | | 9/2003 |
| TW | 200405673 | | 4/2004 |
| TW | 594675 | | 6/2004 |
| TW | I230024 | | 3/2005 |
| TW | 200921644 | | 5/2005 |
| TW | 200534234 | | 10/2005 |
| TW | 2005334234 | | 10/2005 |
| TW | 200537436 | A | 11/2005 |
| WO | 97/15983 | | 5/1997 |
| WO | WO 98/42162 | | 9/1998 |
| WO | 99/49574 | | 9/1999 |
| WO | 9949574 | | 9/1999 |
| WO | WO 03-007656 | | 1/2003 |
| WO | WO 03/007656 | | 1/2003 |
| WO | 03/085643 | | 10/2003 |
| WO | 03-090208 | | 10/2003 |
| WO | 2004-008805 | | 1/2004 |
| WO | 2004/008806 | | 1/2004 |
| WO | 2004-019656 | | 3/2004 |
| WO | 2004/028204 | | 4/2004 |
| WO | 2004-036549 | | 4/2004 |
| WO | 2004-036954 | | 4/2004 |
| WO | 2004-036955 | | 4/2004 |
| WO | 2004036548 | | 4/2004 |
| WO | 2005/036925 | | 4/2005 |
| WO | 2005/043511 | | 5/2005 |
| WO | 2005/069637 | | 7/2005 |
| WO | 2005/069638 | | 7/2005 |
| WO | 2005/081229 | | 9/2005 |
| WO | 2005/098826 | | 10/2005 |
| WO | 2005/101371 | | 10/2005 |
| WO | WO2005101370 | A1 | 10/2005 |
| WO | 2006/002748 | | 1/2006 |
| WO | WO 2006-003813 | | 1/2006 |
| WO | 2007/080212 | | 7/2007 |

OTHER PUBLICATIONS

Pasi, Ojala et al., "Further information on 1-26 Nokia binaural decoder," ITU Study Group 16—Video Coding Experts Group—ISO/IEC MPEG & ITU-T VCEG (ISO/IEC JTC1/SC29/WG11 and ITU-T SG16 Q6), XX, XX, No. M13231; XP030041900 (Mar. 29, 2006).

Kristofer, Kjorling, "Proposal for extended signaling in spatial audio," ITU Study Group 16—Video Coding Experts Group—ISO/IEC MPEG & ITU-T VCEG (ISO/IEC JTC1/SC29/WG11 and ITU-T SG16 Q6), XX, XX, No. M12361; XP030041045 (Jul. 20, 2005).

WD 2 for MPEG Surround, ITU Study Group 16—Video Coding Experts Group—ISO/IEC MPEG & ITU-T VCEG (ISO/IEC JTC1/SC29/WG11 and ITU-T SG16 Q6), XX, XX, No. N7387; XP030013965 (Jul. 29, 2005).

European Search Report for Application No. 06 747 458.5 dated Feb. 4, 2011.

European Search Report for Application No. 06 747 459.3 dated Feb. 4, 2011.

Office Action, Japanese Appln. No. 2008-551196, dated Dec. 21, 2010, 4 pages with English translation.

Chinese Office Action issued in Appln No. 200780004505.3 on Mar. 2, 2011, 14 pages, including English translation.

Breebaart et al., "MPEG Surround Binaural Coding Proposal Philips/CT/ThG/VAST Audio," ITU Study Group 16—Video Coding Experts Group—ISO/IEC MPEG & ITU-T VCEG (ISO/IEC JTC1/SC29/WG11 and ITU-T SG16 Q6), XX, XX, No. M13253, Mar. 29, 2006, 49 pages.

Office Action, U.S. Appl. No. 11/915,327, dated Apr. 8, 2011, 14 pages.

Search Report, European Appln. No. 07701033.8, dated Apr. 1, 2011, 7 pages.

Kjörling et al., "MPEG Surround Amendment Work Item on Complexity Reductions of Binaural Filtering," ITU Study Group 16 Video Coding Experts Group—ISO/IEC MPEG & ITU-T VCEG (ISO/IEC JTC1/SC29/WG11 and ITU-T SG16 Q6), XX, XX, No. M13672, Jul. 12, 2006, 5 pages.

Kok Seng et al., "Core Experiment on Adding 3D Stereo Support to MPEG Surround," ITU Study Group 16 Video Coding Experts Group—ISO/IEC MPEG & ITU-T VCEG (ISO/IEC JTC1/SC29/WG11 and ITU-T SG16 Q6), XX, XX, No. M12845, Jan. 11, 2006, 11 pages.

"Text of ISO/IEC 14496-3:200X/PDAM 4, MPEG Surround," ITU Study Group 16 Video Coding Experts Group—ISO/IEC MPEG & ITU-T VCEG (ISO/IEC JTC1/SC29/WG11 and ITU-T SG16 Q6), XX, XX, No. N7530, Oct. 21, 2005, 169 pages.

Final Office Action, U.S. Appl. No. 11/915,329, dated Mar. 24, 2011, 14 pages.

Japanese Office Action dated Nov. 9, 2010 from Japanese Application No. 2008-551199 with English translation, 11 pages.

Japanese Office Action dated Nov. 9, 2010 from Japanese Application No. 2008-551194 with English translation, 11 pages.

Japanese Office Action dated Nov. 9, 2010 from Japanese Application No. 2008-551193 with English translation, 11 pages.

Japanese Office Action dated Nov. 9, 2010 from Japanese Application No. 2008-551200 with English translation, 11 pages.

Korean Office Action dated Nov. 25, 2010 from Korean Application No. 10-2008-7016481 with English translation, 8 pages.

MPEG-2 Standard. ISO/IEC Document 13818-3:1994(E), Generic Coding of Moving Pictures and Associated Audio information, Part 3: Audio, Nov. 11, 1994, 4 pages.

U.S. Office Action dated Mar. 15, 2012 for U.S. Appl. No. 12/161,558, 4 pages.

U.S. Office Action dated Mar. 30, 2012 for U.S. Appl. No. 11/915,319, 12 pages.

European Office Action dated Apr. 2, 2012 for Application No. 06 747 458.5, 4 pages.

Beack S; et al.; "An Efficient Representation Method for ICLD with Robustness to Spectral Distortion", IETRI Journal, vol. 27, No. 3, Jun. 2005, Electronics and Telecommunications Research Institute, KR, Jun. 1, 2005, XP003008889, 4 pages.

Office Action, U.S. Appl. No. 12/161,563, dated Apr. 16, 2012, 11 pages.

Office Action, U.S. Appl. No. 12/278,775, dated Jun. 11, 2012, 13 pages.

Office Action, U.S. Appl. No. 12/278,774, dated Jun. 18, 2012, 12 pages.

Quackenbush, MPEG Audio Subgroup, Panasonic Presentation, Annex 1—Audio Report, $75^{th}$ meeting, Bangkok, Thailand, Jan. 16-20, 2006, pp. 168-196.

Office Action, U.S. Appl. No. 12/278,568, dated Jul. 6, 2012, 14 pages.

Notice of Allowance, U.S. Appl. No. 12/161,558, dated Aug. 10, 2012, 9 pages.

Chinese Patent Gazette, Chinese Appln. No. 200780001540.X, mailed Jun. 15, 2011, 2 pages with English abstract.

Engdegård et al. "Synthetic Ambience in Parametric Stereo Coding," Audio Engineering Society (AES) 116th Convention, Berlin, Germany, May 8-11, 2004, pp. 1-12.
Search Report, European Appln. No. 07708534.8, dated Jul. 4, 2011, 7 pages.
International Search Report for PCT Application No. PCT/KR2007/000342, dated Apr. 20, 2007, 3 pages.
Notice of Allowance in U.S. Appl. No. 12/161,563, dated Sep. 28, 2012, 10 pages.
Chang, "Document Register for 75th meeting in Bangkok, Thailand", ISO/IEC JTC/SC29/WG11, MPEG2005/M12715, Bangkok, Thailand, Jan. 2006, 3 pages.
Donnelly et al., "The Fast Fourier Transform for Experimentalists, Part II: Convolutions," Computing in Science & Engineering, IEEE, Aug. 1, 2005, vol. 7, No. 4, pp. 92-95.
Office Action, U.S. Appl. No. 12/161,560, dated Oct. 27, 2011, 14 pages.
Office Action, U.S. Appl. No. 12/278,775, dated Dec. 9, 2011, 16 pages.
Office Action, European Appln. No. 07 701 033.8, dated Dec. 16, 2011, 4 pages.
Office Action, U.S. Appl. No. 12/278,569, dated Dec. 2, 2011, 10 pages.
Notice of Allowance, U.S. Appl. No. 12/278,572, dated Dec. 20, 2011, 12 pages.
Notice of Allowance, U.S. Appl. No. 12/161,334, dated Dec. 20, 2011, 11 pages.
Herre et al., "MP3 Surround: Efficient and Compatible Coding of Multi-Channel Audio," Convention Paper of the Audio Engineering Society 116th Convention, Berlin, Germany, May 8, 2004, 6049, pp. 1-14.
Office Action, Japanese Appln. No. 2008-554134, dated Nov. 15, 2011, 6 pages with English translation.
Office Action, Japanese Appln. No. 2008-554141, dated Nov. 24, 2011, 8 pages with English translation.
Office Action, Japanese Appln. No. 2008-554139, dated Nov. 16, 2011, 12 pages with English translation.
Office Action, Japanese Appln. No. 2008-554138, dated Nov. 22, 2011, 7 pages with English translation.
Quackenbush, "Annex I-Audio report" ISO/IEC JTC1/SC29/WG11, MPEG, N7757, Moving Picture Experts Group, Bangkok, Thailand, Jan. 2006, pp. 168-196.
"Text of ISO/IEC 14496-3:2001/FPDAM 4, Audio Lossless Coding (ALS), New Audio Profiles and BSAC Extensions," International Organization for Standardization, ISO/IEC JTC1/SC29/WG11, No. N7016, Hong Kong, China, Jan. 2005, 65 pages.
Kulkarni et al., "On the Minimum-Phase Approximation of Head-Related Transfer Functions," Applications of Signal Processing to Audio and Acoustics, IEEE ASSP Workshop on New Paltz, Oct. 15-18, 1995, 4 pages.
"ISO/IEC 23003-1:2006/FCD, MPEG Surround," ITU Study Group 16, Video Coding Experts Group—ISO/IEC MPEG & ITU-T VCEG (ISO/IEC/JTC1/SC29/WG11 and ITU-T SG16 Q6), XX, XX, No. N7947, Mar. 3, 2006, 186 pages.
Search Report, European Appln. No. 07701037.9, dated Jun. 15, 2011, 8 pages.
Office Action, U.S. Appl. No. 11/915,327, dated Dec. 10, 2010, 20 pages.
Russian Notice of Allowance for Application No. 2008133995 dated Feb. 11, 2010, 11 pages.
European Search Report, EP Application No. 07 708 825.0, mailed May 26, 2010, 8 pages.
Schroeder, E. F. et al., "Der MPEG-2-Standard: Generische Codierung für Bewegtbilder und zugehörige Audio-Information, Audio-Codierung (Teil 4)," Fkt Fernseh Und Kinotechnik, Fachverlag Schiele & Schon Gmbh., Berlin, DE, vol. 47, No. 7-8, Aug. 30, 1994, pp. 364-368 and 370.
Notice of Allowance (English language translation) from RU 2008136007 dated Jun. 8, 2010, 5 pages.
Office Action, Canadian Application No. 2,636,494, mailed Aug. 4, 2010, 3 pages.
Office Action, Japanese Appln. No. 2008-513374, mailed Aug. 24, 2010, 8 pages with English translation.
Faller, "Coding of Spatial Audio Compatible with Different Playback Formats," Proceedings of the Audio Engineering Society Convention Paper, USA, Audio Engineering Society, Oct. 28, 2004, 117th Convention, pp. 1-12.
Schuijers et al., "Advances in Parametric Coding for High-Quality Audio," Proceedings of the Audio Engineering Society Convention Paper 5852, Audio Engineering Society, Mar. 22, 2003, 114th Convention, pp. 1-11.
Japanese Office Action for Application No. 2008-513378, dated Dec. 14, 2009, 12 pages.
Taiwanese Office Action for Application No. 096102407, dated Dec. 10, 2009, 8 pages.
Breebaart, et al.: "Multi-Channel Goes Mobile: MPEG Surround Binaural Rendering" In: Audio Engineering Society the 29th International Conference, Seoul, Sep. 2-4, 2006, pp. 1-13. See the abstract, pp. 1-4, figures 5,6.
Breebaart, J., et al.: "MPEG Spatial Audio Coding/MPEG Surround: Overview and Current Status" In: Audio Engineering Society the 119th Convention, New York, Oct. 7-10, 2005, pp. 1-17. See pp. 4-6.
Faller, C., et al.: "Binaural Cue Coding—Part II: Schemes and Applications", IEEE Transactions on Speech and Audio Processing, vol. 11, No. 6, 2003, 12 pages.
Faller, C.: "Coding of Spatial Audio Compatible with Different Playback Formats", Audio Engineering Society Convention Paper, Presented at 117th Convention, Oct. 28-31, 2004, San Francisco, CA.
Faller, C.: "Parametric Coding of Spatial Audio", Proc. of the 7th Int. Conference on Digital Audio Effects, Naples, Italy, 2004, 6 pages.
Herre, J., et al.: "Spatial Audio Coding: Next generation efficient and compatible coding of multi-channel audio", Audio Engineering Society Convention Paper, San Francisco, CA , 2004, 13 pages.
Herre, J., et al.: "The Reference Model Architecture for MPEG Spatial Audio Coding", Audio Engineering Society Convention Paper 6447, 2005, Barcelona, Spain, 13 pages.
International Search Report in International Application No. PCT/KR2006/000345, dated Apr. 19, 2007, 1 page.
International Search Report in International Application No. PCT/KR2006/000346, dated Apr. 18, 2007, 1 page.
International Search Report in International Application No. PCT/KR2006/000347, dated Apr. 17, 2007, 1 page.
International Search Report in International Application No. PCT/KR2006/000866, dated Apr. 30, 2007, 1 page.
International Search Report in International Application No. PCT/KR2006/000867, dated Apr. 30, 2007, 1 page.
International Search Report in International Application No. PCT/KR2006/000868, dated Apr. 30, 2007, 1 page.
International Search Report in International Application No. PCT/KR2006/001987, dated Nov. 24, 2006, 2 pages.
International Search Report in International Application No. PCT/KR2006/002016, dated Oct. 16, 2006, 2 pages.
International Search Report in International Application No. PCT/KR2006/003659, dated Jan. 9, 2007, 1 page.
International Search Report in International Application No. PCT/KR2006/003661, dated Jan. 11, 2007, 1 page.
International Search Report in International Application No. PCT/KR2007/000340, dated May 4, 2007, 1 page.
International Search Report in International Application No. PCT/KR2007/000668, dated Jun. 11, 2007, 2 pages.
International Search Report in International Application No. PCT/KR2007/000672, dated Jun. 11, 2007, 1 page.
International Search Report in International Application No. PCT/KR2007/000675, dated Jun. 8, 2007, 1 page.
International Search Report in International Application No. PCT/KR2007/000676, dated Jun. 8, 2007, 1 page.
International Search Report in International Application No. PCT/KR2007/000730, dated Jun. 12, 2007, 1 page.
International Search Report in International Application No. PCT/KR2007/001560, dated Jul. 20, 2007, 1 page.
International Search Report in International Application No. PCT/KR2007/001602, dated Jul. 23, 2007, 1 page.
Scheirer, E. D., et al.: "AudioBIFS: Describing Audio Scenes with the MPEG-4 Multimedia Standard", IEEE Transactions on Multimedia, Sep. 1999, vol. 1, No. 3, pp. 237-250. See the abstract.

Vannanen, R., et al.: "Encoding and Rendering of Perceptual Sound Scenes in the Carrouso Project", AES 22nd International Conference on Virtual, Synthetic and Entertainment Audio, Paris, France, 9 pages.
Vannanen, Riitta, "User Interaction and Authoring of 3D Sound Scenes in the Carrouso EU project", Audio Engineering Society Convention Paper 5764, Amsterdam, The Netherlands, 2003, 9 pages.
Hironori Tokuno. Et al. 'Inverse Filter of Sound Reproduction Systems Using Regularization', IEICE Trans. Fundamentals. vol. E80-A.NO.5.May 1997, pp. 809-820.
Korean Office Action for Appln. No. 10-2008-7016477 dated Mar. 26, 2010, 4 pages.
Korean Office Action for Appln. No. 10-2008-7016478 dated Mar. 26, 2010, 4 pages.
Korean Office Action for Appln. No. 10-2008-7016479 dated Mar. 26, 2010, 4 pages.
Taiwanese Office Action for Appln. No. 096102406 dated Mar. 4, 2010, 7 pages.
European Search Report for Application No. 07 708 820.1 dated Apr. 9, 2010, 8 pages.
European Search Report for Application No. 07 708 818.5 dated Apr. 15, 2010, 7 pages.
Korean Office Action for KR Application No. 10-2008-7016477, dated Mar. 26, 2010, 12 pages.
Korean Office Action for KR Application No. 10-2008-7016479, dated Mar. 26, 2010, 11 pages.
Taiwanese Office Action for TW Application No. 96104543, dated Mar. 30, 2010, 12, pages.
Taiwan Patent Office, Office Action in Taiwanese patent application 096102410, dated Jul. 2, 2009, 5 pages.
U.S. Appl. No. 11/915,329, mailed Oct. 8, 2010, 13 pages.
Moon et al., "A Multichannel Audio Compression Method with Virtual Source Location Information for MPEG-4 SAC," IEEE Trans. Consum. Electron., vol. 51, No. 4, Nov. 2005, pp. 1253-1259.
Russian Notice of Allowance for Application No. 2008114388, dated Aug. 24, 2009, 13 pages.
Taiwanese Office Action for Application No. 96104544, dated Oct. 9, 2009, 13 pages.
Office Action, U.S. Appl. No. 12/161,563, dated Jan. 18, 2012, 39 pages.
Office Action, U.S. Appl. No. 12/161,337, dated Jan. 9, 2012, 4 pages.
Office Action, U.S. Appl. No. 12/278,774, dated Jan. 20, 2012, 44 pages.
"Text of ISO/IEC 23003-1:2006/FCD, MPEG Surround," International Organization for Standardization Organisation Internationale De Normalisation, ISO/IEC JTC 1/SC 29/WG 11 Coding of Moving Pictures and Audio, No. N7947, Audio sub-group, Jan. 2006, Bangkok, Thailand, pp. 1-178.
Search Report, European Appln. No. 07708824.3, dated Dec. 15, 2010, 7 pages.
Faller, C. et al., "Efficient Representation of Spatial Audio Using Perceptual Parametrization," Workshop on Applications of Signal Processing to Audio and Acoustics, Oct. 21-24, 2001, Piscataway, NJ, USA, *IEEE*, pp. 199-202.
Office Action, Japanese Appln. No. 2008-551195, dated Dec. 21, 2010, 10 pages with English translation.
Chinese Gazette, Chinese Appln. No. 200680018245.0, dated Jul. 27, 2011, 3 pages with English abstract.
Notice of Allowance, Japanese Appln. No. 2008-551193, dated Jul. 20, 2011, 6 pages with English translation.
Office Action in U.S. Appl. No. 11/915,329, dated Jan. 14, 2013, 11 pages.
U.S. Office Action in U.S. Appl. No. 11/915,327, dated Dec. 12, 2012, 16 pages.
Office Action, U.S. Appl. No. 12/161,560, dated Feb. 17, 2012, 13 pages.
Savioja, "Modeling Techniques for Virtual Acoustics," Thesis, Aug. 24, 2000, 88 pages.
Notice of Allowance in U.S. Appl. No. 11/915,327, mailed Apr. 17, 2013, 13 pages.

* cited by examiner

METHOD AND APPARATUS FOR PROCESSING A MEDIA SIGNAL

TECHNICAL FIELD

The present invention relates to an apparatus for processing a media signal and method thereof, and more particularly to an apparatus for generating a surround signal by using spatial information of the media signal and method thereof.

BACKGROUND ART

Generally, various kinds of apparatuses and methods have been widely used to generate a multi-channel media signal by using spatial information for the multi-channel media signal and a downmix signal, in which the downmix signal is generated by downmixing the multi-channel media signal into mono or stereo signal.

However, the above methods and apparatuses are not usable in environments unsuitable for generating a multi-channel signal. For instance, they are not usable for a device capable of generating only a stereo signal. In other words, there exists no method or apparatus for generating a surround signal, in which the surround signal has multi-channel features in the environment incapable of generating a multi-channel signal by using spatial information of the multi-channel signal.

So, since there exists no method or apparatus for generating a surround signal in a device capable of generating only a mono or stereo signal, it is difficult to process the media signal efficiently.

DISCLOSURE OF INVENTION

Technical Problem

Accordingly, the present invention is directed to an apparatus for processing a media signal and method thereof that substantially obviate one or more of the problems due to limitations and disadvantages of the related art.

An object of the present invention is to provide an apparatus for processing a media signal and method thereof, by which the media signal can be converted to a surround signal by using spatial information for the media signal.

Additional features and advantages of the invention will be set forth in a description which follows, and in part will be apparent from the description, or may be learned by practice of the invention. The objectives and other advantages of the invention will be realized and attained by the structure particularly pointed out in the written description and claims thereof as well as the appended drawings.

Technical Solution

To achieve these and other advantages and in accordance with the purpose of the present invention, a method of processing a signal according to the present invention includes of: generating source mapping information corresponding to each source of multi-sources by using spatial information indicating features between the multi-sources; generating sub-rendering information by applying filter information giving a surround effect to the source mapping information per the source; generating rendering information for generating a surround signal by integrating at least one of the sub-rendering information; and generating the surround signal by applying the rendering information to a downmix signal generated by downmixing the multi-sources.

To further achieve these and other advantages and in accordance with the purpose of the present invention, an apparatus for processing a signal includes a source map ping unit generating source mapping information corresponding to each source of multi-sources by using spatial information indicating features between the multi-sources; a sub-rendering information generating unit generating sub-rendering information by applying filter information having a surround effect to the source mapping information per the source; an integrating unit generating rendering information for generating a surround signal by integrating the at least one of the sub-rendering information; and a rendering unit generating the surround signal by applying the rendering information to a downmix signal generated by downmixing the multi-sources.

It is to be understood that both the foregoing general description and the following detailed description are exemplary and explanatory and are intended to provide further explanation of the invention as claimed.

Advantageous Effects

A signal processing apparatus and method according to the present invention enable a decoder, which receives a bitstream including a downmix signal generated by downmixing a multi-channel signal and spatial information of the multi-channel signal, to generate a signal having a surround effect in environments in incapable of recovering the multi-channel signal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

Figure 1:
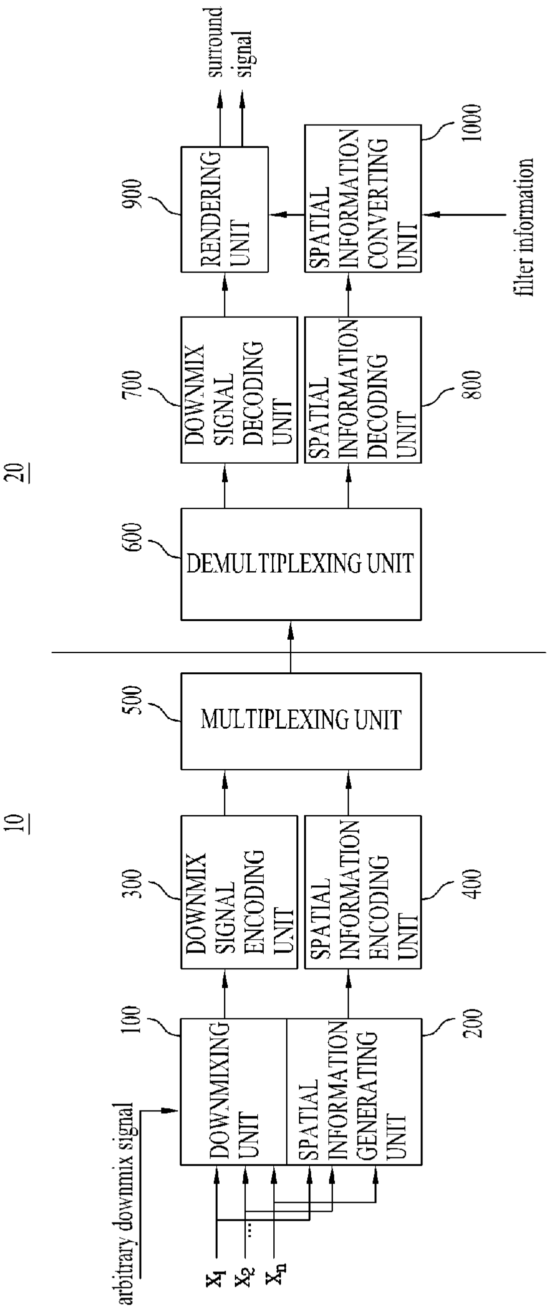
FIG. 1 is a block diagram of an audio signal encoding apparatus and an audio signal decoding apparatus according to one embodiment of the present invention.

FIG. 1 is a block diagram of an audio signal encoding apparatus and an audio signal decoding apparatus according to one embodiment of the present invention.

Referring to FIG. 1, an encoding apparatus 10 includes a downmixing unit 100, a spatial information generating unit 200, a downmix signal encoding unit 300, a spatial information encoding unit 400, and a multiplexing unit 500.

If multi-source (X1, X2, . . . , Xn) audio signal is inputted to the downmixing unit 100, the downmixing unit 100 downmixes the inputted signal into a downmix signal. In this case, the downmix signal includes mono, stereo and multi-source audio signal.

The source includes a channel and, in convenience, is represented as a channel in the following description. In the present specification, the mono or stereo downmix signal is referred to as a reference. Yet, the present invention is not limited to the mono or stereo downmix signal.

The encoding apparatus 10 is able to optionally use an arbitrary downmix signal directly provided from an external environment.

The spatial information generating unit 200 generates spatial information from a multi-channel audio signal. The spatial information can be generated in the course of a downmixing process. The generated downmix signal and spatial information are encoded by the downmix signal encoding unit 300 and the spatial information encoding unit 400, respectively and are then transferred to the multiplexing unit 500.

In the present invention, 'spatial information' means information necessary to generate a multi-channel signal from upmixing a downmix signal by a decoding apparatus, in which the downmix signal is generated by downmixing the multi-channel signal by an encoding apparatus and transferred to the decoding apparatus. The spatial information includes spatial parameters. The spatial parameters include CLD (channel level difference) indicating an energy difference between channels, ICC (inter-channel coherences) indicating a correlation between channels, CPC (channel prediction coefficients) used in generating three channels from two channels, etc.

In the present invention, 'downmix signal encoding unit' or 'downmix signal decoding unit' means a codec that encodes or decodes an audio signal instead of spatial information. In the present specification, a downmix audio signal is taken as an example of the audio signal instead of the spatial information. And, the downmix signal encoding or decoding unit may include MP3, AC-3, DTS, or AAC. Moreover, the downmix signal encoding or decoding unit may include a codec of the future as well as the previously developed codec.

The multiplexing unit 500 generates a bitstream by multiplexing the downmix signal and the spatial information and then transfers the generated bitstream to the decoding apparatus 20. Besides, the structure of the bitstream will be explained in FIG. 2 later.

A decoding apparatus 20 includes a demultiplexing unit 600, a downmix signal decoding unit 700, a spatial information decoding unit 800, a rendering unit 900, and a spatial information converting unit 1000.

The demultiplexing unit 600 receives a bitstream and then separates an encoded downmix signal and an encoded spatial information from the bitstream. Subsequently, the downmix signal decoding unit 700 decodes the encoded downmix signal and the spatial information decoding unit 800 decodes the encoded spatial information.

The spatial information converting unit 1000 generates rendering information applicable to a downmix signal using the decoded spatial information and filter information. In this case, the rendering information is applied to the downmix signal to generate a surround signal.

For instance, the surround signal is generated in the following manner. First of all, a process for generating a downmix signal from a multi-channel audio signal by the encoding apparatus 10 can include several steps using an OTT (one-to-two) or TTT (three-to-three) box. In this case, spatial information can be generated from each of the steps. The spatial information is transferred to the decoding apparatus 20. The decoding apparatus 20 then generates a surround signal by converting the spatial information and then rendering the converted spatial information with a downmix signal. Instead of generating a multi-channel signal by upmixing a downmix signal, the present invention relates to a rendering method including the steps of extracting spatial information for each upmixing step and performing a rendering by using the extracted spatial information. For example, HRTF (head-related transfer functions) filtering is usable in the rendering method.

In this case, the spatial information is a value applicable to a hybrid domain as well. So, the rendering can be classified into the following types according to a domain.

The first type is that the rendering is executed on a hybrid domain by having a downmix signal pass through a hybrid filterbank. In this case, a conversion of domain for spatial information is unnecessary.

The second type is that the rendering is executed on a time domain. In this case, the second type uses a fact that a HRTF filter is modeled as a FIR (finite inverse response) filter or an IIR (infinite inverse response) filter on a time domain. So, a process for converting spatial information to a filter coefficient of time domain is needed.

The third type is that the rendering is executed on a different frequency domain. For instance, the rendering is executed on a DFT (discrete Fourier transform) domain. In this case, a process for transforming spatial information into a corresponding domain is necessary. In particular, the third type enables a fast operation by replacing a filtering on a time domain into an operation on a frequency domain.

In the present invention, filter information is the information for a filter necessary for processing an audio signal and includes a filter coefficient provided to a specific filter. Examples of the filter information are explained as follows. First of all, prototype filter information is original filter information of a specific filter and can be represented as GL_L or the like. Converted filter information indicates a filter coefficient after the prototype filter information has been converted and can be represented as GL_L or the like. Sub-rendering information means the filter information resulting from spatializing the prototype filter information to generate a surround signal and can be represented as FL_L1 or the like. Rendering information means the filter information necessary for executing rendering and can be represented as HL_L or the like. Interpolated/smoothed rendering information means the filter information resulting from interpolation/smoothing the rendering information and can be represented as HL_L or the like. In the present specification, the above filter informations are referred to. Yet, the present invention is not restricted by the names of the filter informations. In particular, HRTF is taken as an example of the filter information. Yet, the present invention is not limited to the HRTF.

The rendering unit 900 receives the decoded downmix signal and the rendering information and then generates a surround signal using the decoded downmix signal and the rendering information. The surround signal may be the signal for providing a surround effect to an audio system capable of generating only a stereo signal. Besides, the present invention can be applied to various systems as well as the audio system capable of generating only the stereo signal.

Figure 2:
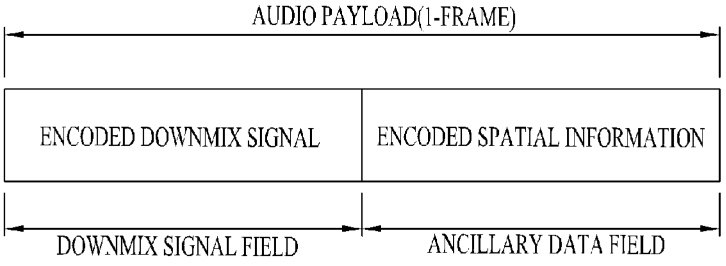
FIG. 2 is a structural diagram of a bitstream of an audio signal according to one embodiment of the present invention.

FIG. 2 is a structural diagram for a bitstream of an audio signal according to one embodiment of the present invention, in which the bitstream includes an encoded downmix signal and encoded spatial information.

Referring to FIG. 2, a 1-frame audio payload includes a downmix signal field and an ancillary data field. Encoded spatial information can be stored in the ancillary data field. For instance, if an audio payload is 48~128 kbps, spatial information can have a range of 5~32 kbps. Yet, no limitations are put on the ranges of the audio payload and spatial information.

Figure 3:
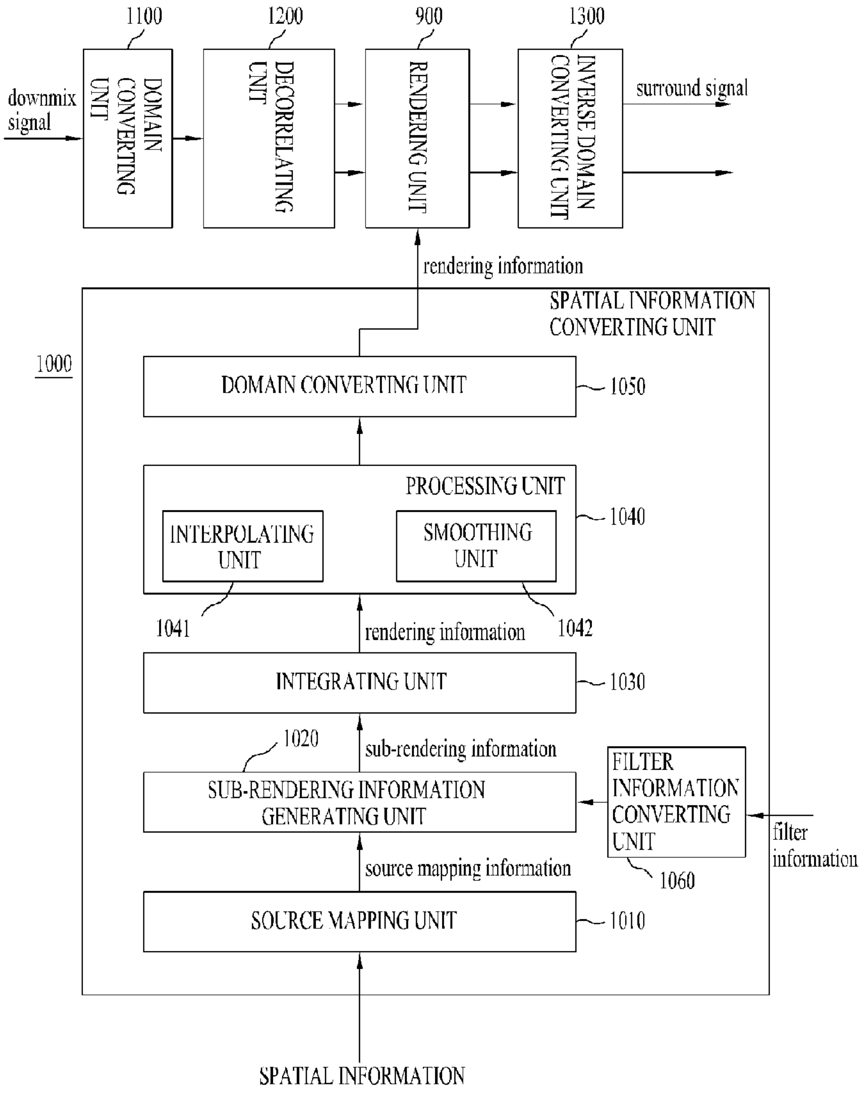
FIG. 3 is a detailed block diagram of a spatial information converting unit according to one embodiment of the present invention.

FIG. 3 is a detailed block diagram of a spatial information converting unit according to one embodiment of the present invention.

Referring to FIG. 3, a spatial information converting unit 1000 includes a source mapping unit 1010, a sub-rendering information generating unit 1020, an integrating unit 1030, a processing unit 1040, and a domain converting unit 1050.

The source mapping unit 101 generates source mapping information corresponding to each source of an audio signal by executing source mapping using spatial information. In this case, the source mapping information means per-source information generated to correspond to each source of an audio signal by using spatial information and the like. The source includes a channel and, in this case, the source mapping information corresponding to each channel is generated. The source mapping information can be represented as a coefficient. And, the source mapping process will be explained in detail later with reference to FIG. 4 and FIG. 5.

The sub-rendering information generating unit 1020 generates sub-rendering information corresponding to each source by using the source mapping information and the filter information. For instance, if the rendering unit 900 is the HRTF filter, the sub-rendering information generating unit 1020 is able to generate sub-rendering information by using HRTF filter information.

The integrating unit 1030 generates rendering information by integrating the sub-rendering information to correspond to each source of a downmix signal. The rendering information, which is generated by using the spatial information and the filter information, means the information to generate a surround signal by being applied to the downmix signal. And, the rendering information includes a filter coefficient type. The integration can be omitted to reduce an operation quantity of the rendering process. Subsequently, the rendering information is transferred to the processing unit 1042.

The processing unit 1042 includes an interpolating unit 1041 and/or a smoothing unit 1042. The rendering information is interpolated by the interpolating unit 1041 and/or smoothed by the smoothing unit 1042.

The domain converting unit 1050 converts a domain of the rendering information to a domain of the downmix signal used by the rendering unit 900. And, the domain converting unit 1050 can be provided to one of various positions including the position shown in FIG. 3. So, if the rendering information is generated on the same domain of the rendering unit 900, it is able to omit the domain converting unit 1050. The domain-converted rendering information is then transferred to the rendering unit 900.

The spatial information converting unit 1000 can include a filter information converting unit 1060. In FIG. 3, the filter information converting unit 1060 is provided within the spatial information converting unit 100. Alternatively, the filter information converting unit 1060 can be provided outside the spatial information converting unit 100. The filter information converting unit 1060 is converted to be suitable for generating sub-rendering information or rendering information from random filter information, e.g., HRTF. The converting process of the filter information can include the following steps.

First of all, a step of matching a domain to be applicable is included. If a domain of filter information does not match a domain for executing rendering, the domain matching step is required. For instance, a step of converting time domain HRTF to DFT, QMF or hybrid domain for generating rendering information is necessary.

Secondly, a coefficient reducing step can be included. In this case, it is easy to save the domain-converted HRTF and apply the domain-converted HRTF to spatial information. For instance, if a prototype filter coefficient has a response of a long tap number (length), a corresponding coefficient has to be stored in a memory corresponding to a response amounting to a corresponding length of total 10 in case of 5.1 channels. This increases a load of the memory and an operational quantity. To prevent this problem, a method of reducing a filter coefficient to be stored while maintaining filter characteristics in the domain converting process can be used. For instance, the HRTF response can be converted to a few parameter value. In this case, a parameter generating process and a parameter value can differ according to an applied domain.

The downmix signal passes through a domain converting unit 1110 and/or a decorrelating unit 1200 before being rendered with the rendering information. In case that a domain of the rendering information is different from that of the downmix signal, the domain converting unit 1110 converts the domain of the downmix signal in order to match the two domains together.

The decorrelating unit 1200 is applied to the domain-converted downmix signal. This may have an operational quantity relatively higher than that of a method of applying a decorrelator to the rendering information. Yet, it is able to prevent distortions from occurring in the process of generating rendering information. The decorrelating unit 1200 can include a plurality of decorrelators differing from each other in characteristics if an operational quantity is allowable. If the downmix signal is a stereo signal, the decorrelating unit 1200 may not be used. In FIG. 3, in case that a domain-converted mono downmix signal, i.e., a mono downmix signal on a frequency, hybrid, QMF or DFT domain is used in the rendering process, a decorrelator is used on the corresponding domain. And, the present invention includes a decorrelator used on a time domain as well. In this case, a mono downmix signal before the domain converting unit 1100 is directly inputted to the decorrelating unit 1200. A first order or higher IIR filter (or FIR filter) is usable as the decorrelator.

Subsequently, the rendering unit 900 generates a surround signal using the downmix signal, the decorrelated downmix signal, and the rendering information. If the downmix signal is a stereo signal, the decorrelated downmix signal may not be used. Details of the rendering process will be described later with reference to FIGS. 6 to 9.

The surround signal is converted to a time domain by an inverse domain converting unit 1300 and then outputted. If so, a user is able to listen to a sound having a multi-channel effect though stereophonic earphones or the like.

Figure 4:
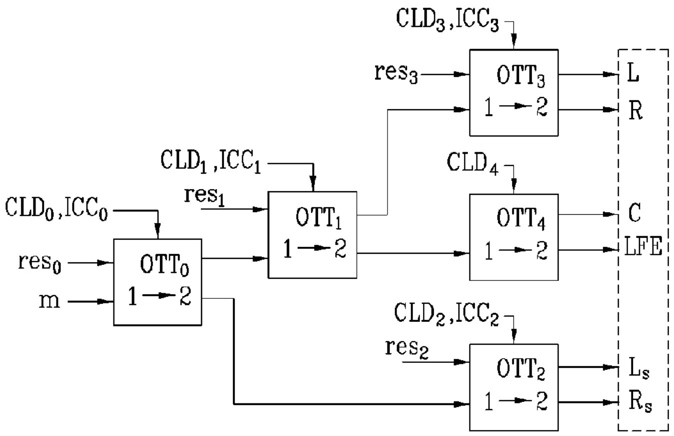
FIG. 4 and FIG. 5 are block diagrams of channel configurations used for source mapping process according to one embodiment of the present invention.
Figure 5:
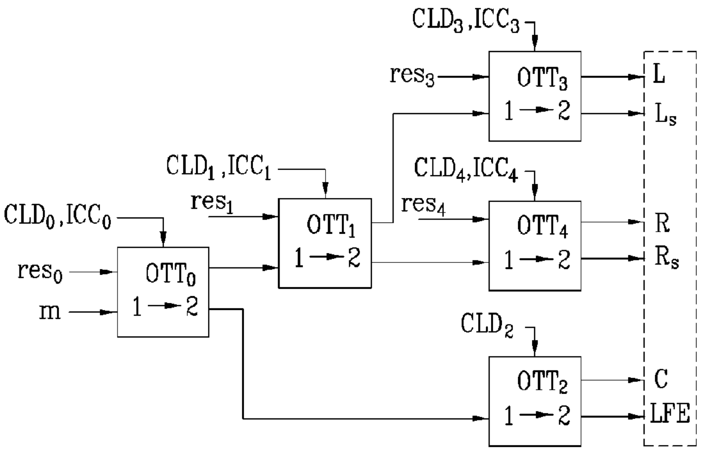

FIG. 4 and FIG. 5 are block diagrams of channel configurations used for source mapping process according to one embodiment of the present invention. A source mapping process is a process for generating source mapping information corresponding to each source of an audio signal by using spatial information. As mentioned in the foregoing description, the source includes a channel and source mapping information can be generated to correspond to the channels shown in FIG. 4 and FIG. 5. The source mapping information is generated in a type suitable for a rendering process.

For instance, if a downmix signal is a mono signal, it is able to generate source mapping information using spatial information such as CLD1~CLD5, ICC1~ICC5, and the like.

The source mapping information can be represented as such a value as D_L (=$D_L$), D_R (=$D_R$), D_C (=$D_C$), D_LFE (=$D_{LFE}$), D_Ls (=$D_{Ls}$), D_Rs (=$D_{Rs}$), and the like. In this case, the process for generating the source mapping information is variable according to a tree structure corresponding to spatial information, a range of spatial information to be used, and the like. In the present specification, the downmix signal is a mono signal for example, which does not put limitation of the present invention.

Right and left channel outputs outputted from the rendering unit 900 can be expressed as Math Figure 1.

$$Lo=L*GL\_L'+C*GC\_L'+R*GR\_L'+Ls*GLs\_L'+Rs*GRs\_L'$$

$$Ro=L*GL\_R'+C*GC\_R'+R*GR\_R'+Ls*GLs\_R'+Rs*GRs\_R' \quad \text{MathFigure 1}$$

In this case, the operator '*' indicates a product on a DFT domain and can be replaced by a convolution on a QMF or time domain.

The present invention includes a method of generating the L, C, R, Ls and Rs by source mapping information using spatial information or by source mapping information using spatial information and filter information. For instance, source mapping information can be generated using CLD of spatial information only or CLD and ICC of spatial information. The method of generating source mapping information using the CLD only is explained as follows.

In case that the tree structure has a structure shown in FIG. 4, a first method of obtaining source mapping information using CLD only can be expressed as Math Figure 2.

$$\begin{bmatrix} L \\ R \\ C \\ LFE \\ Ls \\ Rs \end{bmatrix} = \begin{bmatrix} D_L \\ D_R \\ D_C \\ D_{LFE} \\ D_{Ls} \\ D_{Rs} \end{bmatrix} m = \begin{bmatrix} c_{1,OTT3}c_{1,OTT1}c_{1,OTT0} \\ c_{2,OTT3}c_{1,OTT1}c_{1,OTT0} \\ c_{1,OTT4}c_{2,OTT1}c_{1,OTT0} \\ c_{2,OTT4}c_{2,OTT1}c_{1,OTT0} \\ c_{1,OTT2}c_{2,OTT0} \\ c_{2,OTT2}c_{2,OTT0} \end{bmatrix} m \quad \text{MathFigure 2}$$

In this case, $$c_{1,OTT_n}^{l,m} = \sqrt{\frac{10^{\frac{CLD_N^{l,m}}{10}}}{1+10^{\frac{CLD_N^{l,m}}{10}}}},$$

$$c_{2,OTT_N}^{l,m} = \sqrt{\frac{1}{1+10^{\frac{CLD_N^{l,m}}{10}}}},$$

and 'm' indicates a mono downmix signal.

In case that the tree structure has a structure shown in FIG. 5, a second method of obtaining source mapping information using CLD only can be expressed as Math Figure 3.

$$\begin{bmatrix} L \\ Ls \\ R \\ Rs \\ C \\ LFE \end{bmatrix} = \begin{bmatrix} D_L \\ D_{Ls} \\ D_R \\ D_{Rs} \\ D_C \\ D_{LFE} \end{bmatrix} m = \begin{bmatrix} c_{1,OTT3}c_{1,OTT1}c_{1,OTT0} \\ c_{2,OTT3}c_{1,OTT1}c_{1,OTT0} \\ c_{1,OTT4}c_{2,OTT1}c_{1,OTT0} \\ c_{2,OTT4}c_{2,OTT1}c_{1,OTT0} \\ c_{1,OTT2}c_{2,OTT0} \\ c_{2,OTT2}c_{2,OTT0} \end{bmatrix} m \quad \text{MathFigure 3}$$

If source mapping information is generated using CLD only, a 3-dimensional effect may be reduced. So, it is able to generate source mapping information using ICC and/or decorrelator. And, a multi-channel signal generated by using a decorrelator output signal dx(m) can be expresses as Math Figure 4.

$$\begin{bmatrix} L \\ R \\ C \\ LFE \\ Ls \\ Rs \end{bmatrix} = \begin{bmatrix} A_{L1}m + B_{L0}d_0(m) + B_{L1}d_1(C_{L1}m) + B_{L3}d_3(C_{L3}m) \\ A_{R1}m + B_{R0}d_0(m) + B_{R1}d_1(C_{R1}m) + B_{R3}d_3(C_{R3}m) \\ A_{C1}m + B_{C0}d_0(m) + B_{C1}d_1(C_{C1}m) \\ c_{2,OTT4}c_{2,OTT1}c_{1,OTT0}m \\ A_{LS1}m + B_{LS0}d_0(m) + B_{LS2}d_2(C_{LS2}m) \\ A_{RS1}m + B_{RS0}d_0(m) + B_{RS2}d_2(C_{RS2}m) \end{bmatrix}$$ MathFigure 4

In this case, 'A', 'B' and 'C' are values that can be represented by using CLD and ICC. '$d_0$' to '$d_3$' indicate decorrelators. And, 'm' indicates a mono downmix signal. Yet, this method is unable to generate source mapping information such as D_L, D_R, and the like.

Hence, the first method of generating the source mapping information using the CLD, ICC and/or decorrelators for the downmix signal regards dx(m) (x=0, 1, 2) as an independent input. In this case, the 'dx' is usable for a process for generating sub-rendering filter information according to Math Figure 5.

*FL_L_M=d_L_M*GL_L'*(Mono input→Left output)

*FL_R_M=d_L_M*GL_R'*(Mono input→Right output)

*FL_L_Dx=d_L_DX*GL_L'*(*Dx* output→Left output)

*FL_R_Dx=d_L_Dx*GL_R'*(*Dx* output→Right output) MathFigure 5

Figure 6:
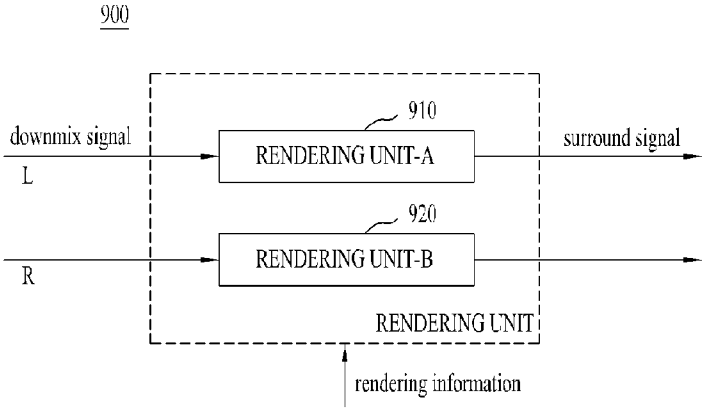
FIG. 6 and FIG. 7 are detailed block diagrams of a rendering unit for a stereo downmix signal according to one embodiment of the present invention.

And, rendering information can be generated according to Math Figure 6 using a result of Math Figure 5.

*HM_L=FL_L_M+FR_L_M+FC_L_M+FRS_L_M+FLFE_L_M*

*HM_R=FL_R_M+FR_R_M+FC_R_M+FLS_R_M+FRS_R_M+FLFE_R_M*

*HDx_L=FL_L_Dx+FR_L_Dx+FC_L_Dx+FLS_L_Dx+FRS_L_Dx+FLFE_L_Dx*

*HDx_R=FL_R_Dx+FR_R_Dx+FC_R_Dx+FLS_R_Dx+FRS_R_Dx+FLFE_R_Dx* MathFigure 6

Details of the rendering information generating process are explained later. The first method of generating the source mapping information using the CLD, ICC and/or decorrelators handles a dx output value, i.e., 'dx(m)' as an independent input, which may increase an operational quantity.

A second method of generating source mapping information using CLD, ICC and/or decorrelators employs decorrelators applied on a frequency domain. In this case, the source mapping information can be expresses as Math Figure 7.

$$\begin{bmatrix} L \\ R \\ C \\ LFE \\ Ls \\ Rs \end{bmatrix} = \begin{bmatrix} A_{L1}m + B_{L0}d_0m + B_{L1}d_1C_{L1}m + B_{L3}d_3C_{L3}m \\ A_{R1}m + B_{R0}d_0m + B_{R1}d_1C_{R1}m + B_{R3}d_3C_{R3}m \\ A_{C1}m + B_{C0}d_0m + B_{C1}d_1C_{C1}m \\ c_{2,OTT4}c_{2,OTT1}c_{1,OTT0}m \\ A_{LS1}m + B_{LS0}d_0m + B_{LS2}d_2C_{LS2}m \\ A_{RS1}m + B_{RS0}d_0m + B_{RS2}d_2C_{RS2}m \end{bmatrix} = \begin{bmatrix} A_{L1} + B_{L0}d_0 + B_{L1}d_1C_{L1} + B_{L3}d_3C_{L3} \\ A_{R1} + B_{R0}d_0 + B_{R1}d_1C_{R1} + B_{R3}d_3C_{R3} \\ A_{C1} + B_{C0}d_0 + B_{C1}d_1C_{C1} \\ c_{2,OTT4}c_{2,OTT1}c_{1,OTT0}m \\ A_{LS1} + B_{LS0}d_0 + B_{LS2}d_2C_{LS2} \\ A_{RS1} + B_{RS0}D_0 + B_{RS2}D_2C_{RS2} \end{bmatrix} m$$ MathFigure 7

In this case, by applying decorrelators on a frequency domain, the same source mapping information such as D_L, D_R, and the like before the application of the decorrelators can be generated. So, it can be implemented in a simple manner.

A third method of generating source mapping information using CLD, ICC and/or decorrelators employs decorrelators having the all-pass characteristic as the decorrelators of the second method. In this case, the all-pass characteristic means that a size is fixed with a phase variation only. And, the present invention can use decorrelators having the all-pass characteristic as the decorrelators of the first method.

A fourth method of generating source mapping information using CLD, ICC and/or decorrelators carries out decorrelation by using decorrelators for the respective channels (e.g., L, R, C, Ls, Rs, etc.) instead of using '$d_0$' to '$d_3$' of the second method. In this case, the source mapping information can be expressed as Math Figure 8.

$$\begin{bmatrix} L \\ R \\ C \\ LFE \\ Ls \\ Rs \end{bmatrix} = \begin{bmatrix} A_{L1} + K_Ld_L \\ A_{R1} + K_Rd_R \\ A_{C1} + K_Cd_C \\ c_{2,OTT4}c_{2,OTT1}c_{1,OTT0} \\ A_{LS1} + K_{Ls}d_{Ls} \\ A_{RS1} + K_{Rs}d_{Rs} \end{bmatrix} m$$ MathFigure 8

In this case, 'k' is an energy value of a decorrelated signal determined from CLD and ICC values. And, 'd_L', 'd_R', 'd_C', 'd_Ls' and 'd_Rs' indicate decorrelators applied to channels, respectively.

A fifth method of generating source mapping information using CLD, ICC and/or decorrelators maximizes a decorrelation effect by configuring 'd_L' and 'd_R' symmetric to each other in the fourth method and configuring 'd_Ls' and 'd_Rs' symmetric to each other in the fourth method. In particular, assuming d_R=f(d_L) and d_Rs=f(d_Ls), it is necessary to design 'd_L', 'd_C' and 'd_Ls' only.

A sixth method of generating source mapping information using CLD, ICC and/or decorrelators is to configure the 'd_L' and 'd_Ls' to have a correlation in the fifth method. And, the 'd_L' and 'd_C' can be configured to have a correlation as well.

A seventh method of generating source mapping information using CLD, ICC and/or decorrelators is to use the decorrelators in the third method as a serial or nested structure of the all-pas filters. The seventh method utilizes a fact that the all-pass characteristic is maintained even if the all-pass filter is used as the serial or nested structure. In case of using the all-pass filter as the serial or nested structure, it is able to obtain more various kinds of phase responses. Hence, the decorrelation effect can be maximized.

An eighth method of generating source mapping information using CLD, ICC and/or decorrelators is to use the related art decorrelator and the frequency-domain decorrelator of the second method together. In this case, a multi-channel signal can be expressed as Math Figure 9.

MathFigure 9

$$\begin{bmatrix} L \\ R \\ C \\ LFE \\ Ls \\ Rs \end{bmatrix} = \begin{bmatrix} A_{L1} + K_L d_L \\ A_{R1} + K_R d_R \\ A_{C1} + K_C d_C \\ c_{2,OTT4} c_{2,OTT1} c_{1,OTT0} \\ A_{LS1} + K_{Ls} d_{Ls} \\ A_{RS1} + K_{Rs} d_{Rs} \end{bmatrix} m + \begin{bmatrix} P_{L0} d_{new0}(m) + P_{L1} d_{new1}(m) + \ldots \\ P_{R0} d_{new0}(m) + P_{R1} d_{new1}(m) + \ldots \\ P_{C0} d_{new0}(m) + P_{C1} d_{new1}(m) + \ldots \\ 0 \\ P_{Ls0} d_{new0}(m) + P_{Ls1} d_{new1}(m) + \ldots \\ P_{Rs0} d_{new0}(m) + P_{Rs1} d_{new1}(m) + \ldots \end{bmatrix}$$

In this case, a filter coefficient generating process uses the same process explained in the first method except that 'A' is changed into 'A+Kd'.

A ninth method of generating source mapping information using CLD, ICC and/or decorrelators is to generate an additionally decorrelated value by applying a frequency domain decorrelator to an output of the related art decorrelator in case of using the related art decorrelator. Hence, it is able to generate source mapping information with a small operational quantity by overcoming the limitation of the frequency domain decorrelator.

Figure 10:
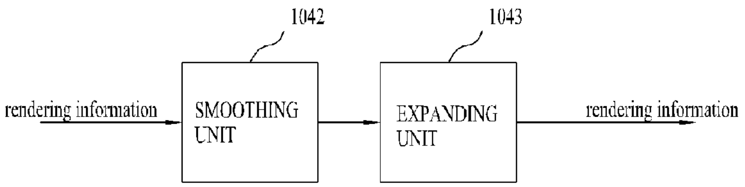
FIG. 10 and FIG. 11 are block diagrams of a smoothing unit and an expanding unit according to one embodiment of the present invention.

A tenth method of generating source mapping information using CLD, ICC and/or decorrelators is expressed as Math Figure 10.

MathFigure 10

$$\begin{bmatrix} L \\ R \\ C \\ LFE \\ Ls \\ Rs \end{bmatrix} = \begin{bmatrix} A_{L1} m + K_L d_L(m) \\ A_{R1} m + K_R d_R(m) \\ A_{C1} m + K_C d_C(m) \\ c_{2,OTT4} c_{2,OTT1} c_{1,OTT0} m \\ A_{Ls1} m + K_{Ls} d_{Ls}(m) \\ A_{RS1} m + K_{Rs} d_{Rs}(m) \end{bmatrix}$$

In this case, 'di_(m)' (i=L, R, C, Ls, Rs) is a decorrelator output value applied to a channel-i. And, the output value can be processed on a time domain, a frequency domain, a QMF domain, a hybrid domain, or the like. If the output value is processed on a domain different from a currently processed domain, it can be converted by domain conversion. It is able to use the same 'd for d_L, d_R, d_C, d_Ls, and d_Rs. In this case, Math Figure 10 can be expressed in a very simple manner.

Figure 11:
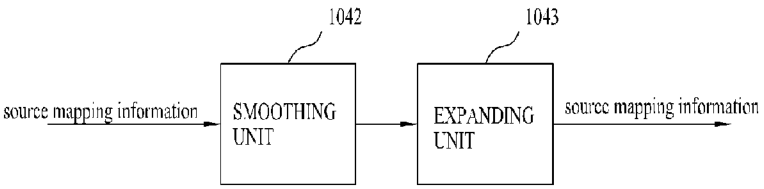

If Math Figure 10 is applied to Math Figure 1, Math Figure 1 can be expressed as Math Figure 11.

$$Lo=HM\_L*m+HMD\_L*d(m)$$

$$Ro=HM\_R*R+HMD\_R*d(m)$$

MathFigure 11

In this case, rendering information HM_L is a value resulting from combining spatial information and filter information to generate a surround signal Lo with an input m. And, rendering information HM_R is a value resulting from combining spatial information and filter information to generate a surround signal Ro with an input m. Moreover, 'd(m)' is a decorrelator output value generated by transferring a decorrelator output value on an arbitrary domain to a value on a current domain or a decorrelator output value generated by being processed on a current domain. Rendering information HMD_L is a value indicating an extent of the decorrelator output value d(m) that is added to 'Lo' in rendering the d(m), and also a value resulting from combining spatial information and filter information together. Rendering information HMD_R is a value indicating an extent of the decorrelator output value d(m) that is added to 'Ro' in rendering the d(m).

Thus, in order to perform a rendering process on a mono downmix signal, the present invention proposes a method of generating a surround signal by rendering the rendering information generated by combining spatial information and filter information (e.g., HRTF filter coefficient) to a downmix signal and a decorrelated downmix signal. The rendering process can be executed regardless of domains. If 'd(m)' is expressed as 'd*m' (product operator) being executed on a frequency domain, Math Figure 11 can be expressed as Math Figure 12.

$$Lo=HM\_L*m+HMD\_L*d*m=HM\text{overall}\_L*m$$

$$Ro=HM\_R*m+HMD\_R*d*m=HM\text{overall}\_R*m$$

MathFigure 12

Thus, in case of performing a rendering process on a downmix signal on a frequency domain, it is able to minimize an operational quantity in a manner of representing a value resulting from combining spatial information, filter information and decorrelators appropriately as a product form.

Figure 7:
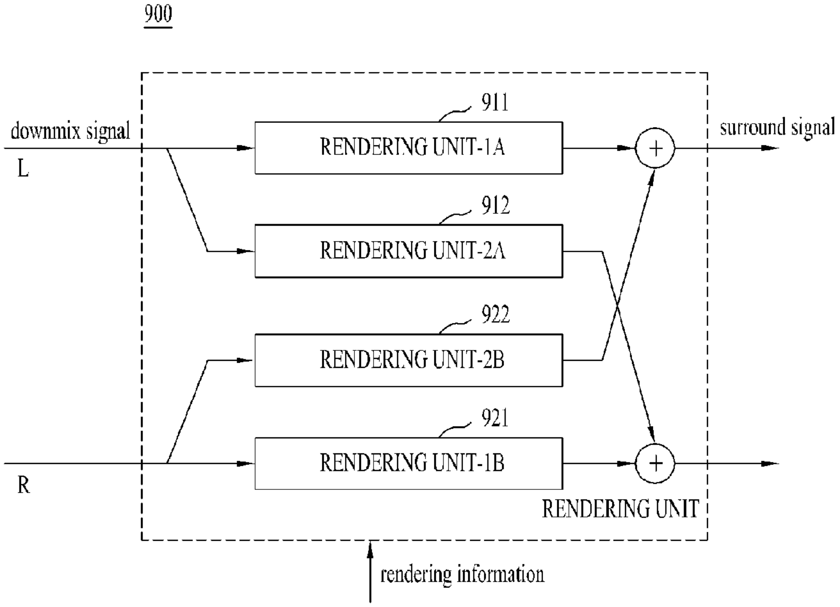

FIG. 6 and FIG. 7 are detailed block diagrams of a rendering unit for a stereo downmix signal according to one embodiment of the present invention.

Referring to FIG. 6, the rendering unit 900 includes a rendering unit-A 910 and a rendering unit-B 920.

If a downmix signal is a stereo signal, the spatial information converting unit 1000 generates rendering information for left and right channels of the downmix signal. The rendering unit-A 910 generates a surround signal by rendering the rendering information for the left channel of the downmix signal to the left channel of the downmix signal. And, the rendering unit-B 920 generates a surround signal by rendering the rendering information for the right channel of the downmix signal to the right channel of the downmix signal. The names of the channels are just exemplary, which does not put limitation on the present invention.

The rendering information can include rendering information delivered to a same channel and rendering information delivered to another channel.

For instance, the spatial information converting unit 1000 is able to generate rendering information HL_L and HL_R inputted to the rendering unit for the left channel of the downmix signal, in which rendering information HL_L is delivered to a left output corresponding to the same channel and the rendering information HL_R is delivered to a right output corresponding to the another channel. And, the spatial information converting unit 1000 is able to generate rendering information HR_R and HR_L inputted to the rendering unit for the right channel of the downmix signal, in which the rendering information HR_R is delivered to a right output corresponding to the same channel and the rendering information HR_L is delivered to a left output corresponding to the another channel.

Referring to FIG. 7, the rendering unit 900 includes a rendering unit-1A 911, a rendering unit-2A 912, a rendering unit-1B 921, and a rendering unit-2B 922.

The rendering unit 900 receives a stereo downmix signal and rendering information from the spatial information converting unit 1000. Subsequently, the rendering unit 900 generates a surround signal by rendering the rendering information to the stereo downmix signal.

In particular, the rendering unit-1A 911 performs rendering by using rendering information HL_L delivered to a same channel among rendering information for a left channel of a downmix signal. The rendering unit-2A 912 performs rendering by using rendering information HL_R delivered to a another channel among rendering information for a left channel of a downmix signal. The rendering unit-1B 921 performs rendering by using rendering information HR_R delivered to a same channel among rendering information for a right channel of a downmix signal. And, the rendering unit-2B 922 performs rendering by using rendering information HR_L delivered to another channel among rendering information for a right channel of a downmix signal.

In the following description, the rendering information delivered to another channel is named 'cross-rendering information' The cross-rendering information HL_R or HR_L is applied to a same channel and then added to another channel by an adder. In this case, the cross-rendering information HL_R and/or HR_L can be zero. If the cross-rendering information HL_R and/or HR_L is zero, it means that no contribution is made to the corresponding path.

An example of the surround signal generating method shown in FIG. 6 or FIG. 7 is explained as follows.

Figure 13:
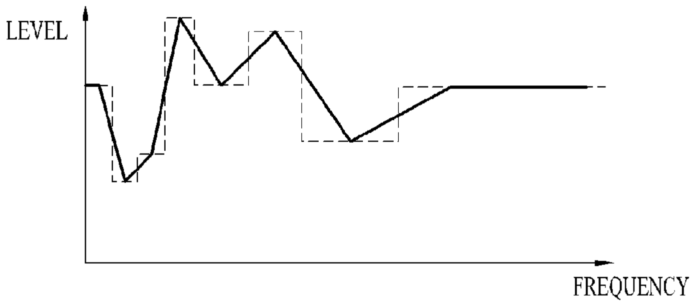
FIG. 13 is a graph to explain a second smoothing method according to one embodiment of the present invention.

First of all, if a downmix signal is a stereo signal, the downmix signal defined as 'x', source mapping information generated by using spatial information defined as 'D', prototype filter information defined as 'G', a multi-channel signal defined as 'p' and a surround signal defined as 'y' can be represented by matrixes shown in Math Figure 13.

MathFigure 13

$$x = \begin{bmatrix} Li \\ Ri \end{bmatrix},$$

$$p = \begin{bmatrix} L \\ Ls \\ R \\ Rs \\ C \\ LFE \end{bmatrix},$$

$$D = \begin{bmatrix} D\_L1 & D\_L2 \\ D\_Ls1 & D\_Ls2 \\ D\_R1 & D\_R2 \\ D\_Rs1 & D\_Rs2 \\ D\_C1 & D\_C2 \\ D\_LFE1 & D\_LFE2 \end{bmatrix},$$

$$G = \begin{bmatrix} GL\_L & GLs\_L & GR\_L & GRs\_L & GC\_L & GLFE\_L \\ GL\_R & GLs\_R & GR\_R & GRs\_R & GC\_R & GLFE\_R \end{bmatrix}$$

$$y = \begin{bmatrix} Lo \\ Ro \end{bmatrix}$$

In this case, if the above values are on a frequency domain, they can be developed as follows.

Figure 14:
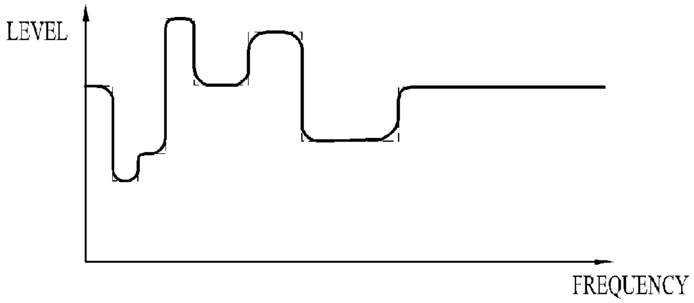
FIG. 14 is a graph to explain a third smoothing method according to one embodiment of the present invention.

First of all, the multi-channel signal p, as shown in Math Figure 14, can be expressed as a product between the source mapping information D generated by using the spatial information and the downmix signal x.

MathFigure 14

$$p = D \cdot x,$$

$$\begin{bmatrix} L \\ Ls \\ R \\ Rs \\ C \\ LFE \end{bmatrix} = \begin{bmatrix} D\_L1 & D\_L2 \\ D\_Ls1 & D\_Ls2 \\ D\_R1 & D\_R2 \\ D\_Rs1 & D\_Rs2 \\ D\_C1 & D\_C2 \\ D\_LFE1 & D\_LFE2 \end{bmatrix} \begin{bmatrix} Li \\ Ri \end{bmatrix}$$

Figure 15:
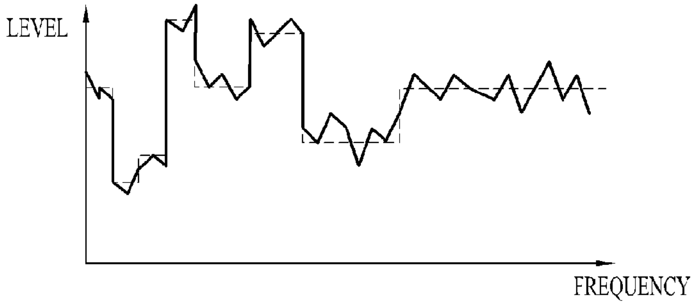
FIG. 15 is a graph to explain a fourth smoothing method according to one embodiment of the present invention.

The surround signal y, as shown in Math Figure 15, can be generated by rendering the prototype filter information G to the multi-channel signal p.

MathFigure 15

$$y = G \cdot p$$

Figure 16:
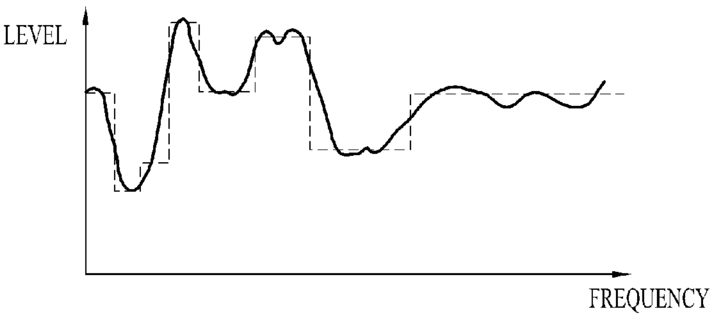
FIG. 16 is a graph to explain a fifth smoothing method according to one embodiment of the present invention.

In this case, if Math Figure 14 is inserted in the p, it can be generated as Math Figure 16.

MathFigure 16

$$y = GDx$$

Figure 17:
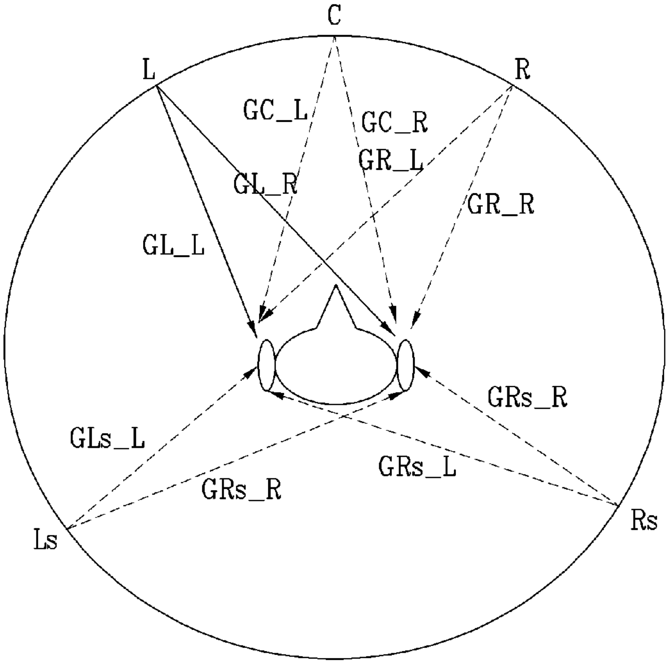
FIG. 17 is a diagram to explain prototype filter information corresponding to each channel.

In this case, if rendering information H is defined as H=GD, the surround signal y and the downmix signal x can have a relation of Math Figure 17.

MathFigure 17

$$H = \begin{bmatrix} HL\_L & HR\_L \\ HL\_R & HR\_R \end{bmatrix},$$

$$y = Hx$$

Hence, after the rendering information H has been generated by processing the product between the filter information and the source mapping information, the downmix signal x is multiplied by the rendering information H to generate the surround signal y.

Figure 18:
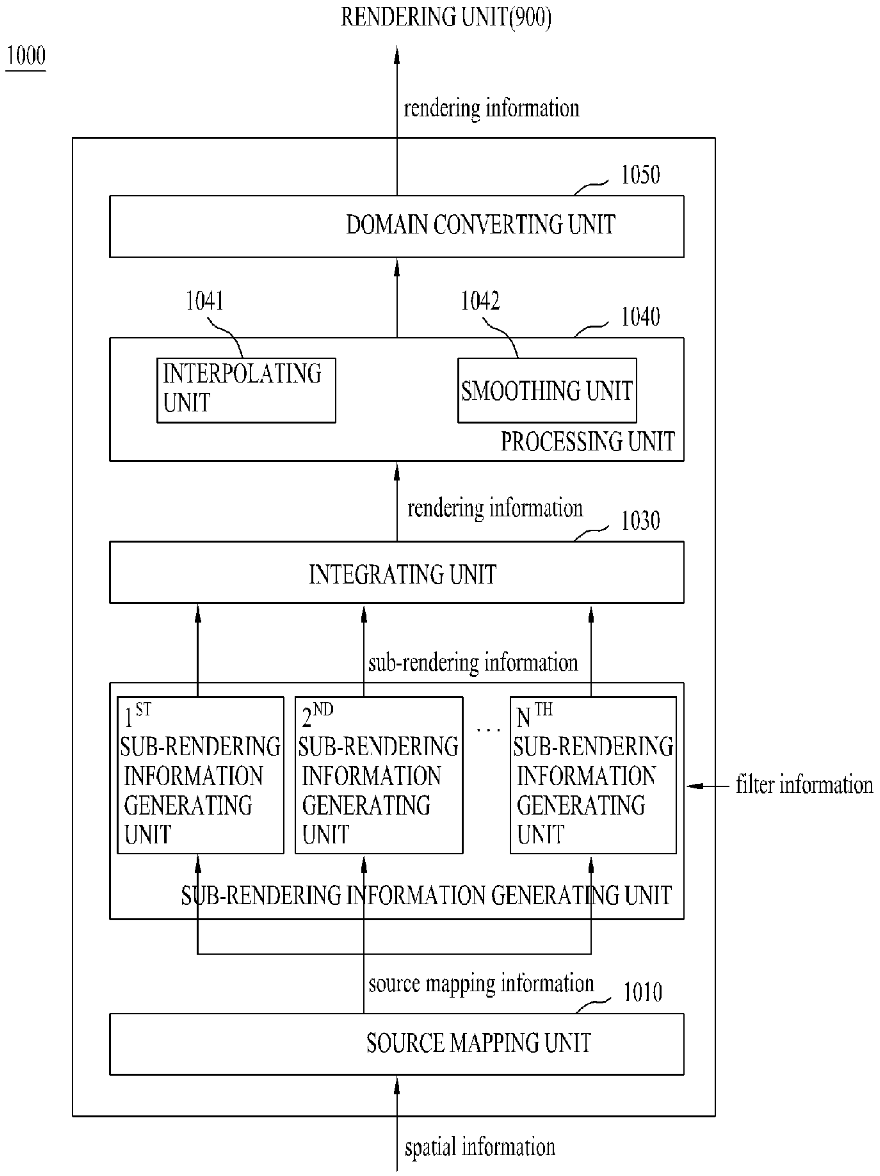
FIG. 18 is a block diagram for a first method of generating rendering filter information in a spatial information converting unit according to one embodiment of the present invention.

According to the definition of the rendering information H, the rendering information H can be expressed as Math Figure 18.

MathFigure 18

$$H = GD$$

$$\begin{bmatrix} GL\_L & GLs\_L & GR\_L & GRs\_L & GC\_L & GLFE\_L \\ GL\_R & GLs\_R & GR\_R & GRs\_R & GC\_R & GLFE\_R \end{bmatrix}$$

$$\begin{bmatrix} D\_L1 & D\_L2 \\ D\_Ls1 & D\_Ls2 \\ D\_R1 & D\_R2 \\ D\_Rs1 & D\_Rs2 \\ D\_C1 & D\_C2 \\ D\_LFE1 & D\_LFE2 \end{bmatrix}$$

Figure 8:
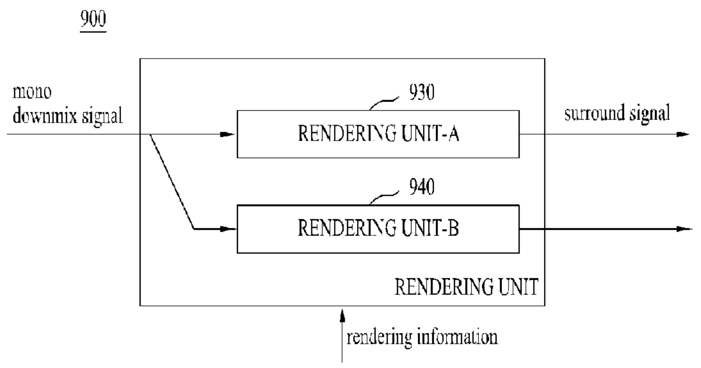
FIG. 8 and FIG. 9 are detailed block diagrams of a rendering unit for a mono downmix signal according to one embodiment of the present invention.
Figure 9:
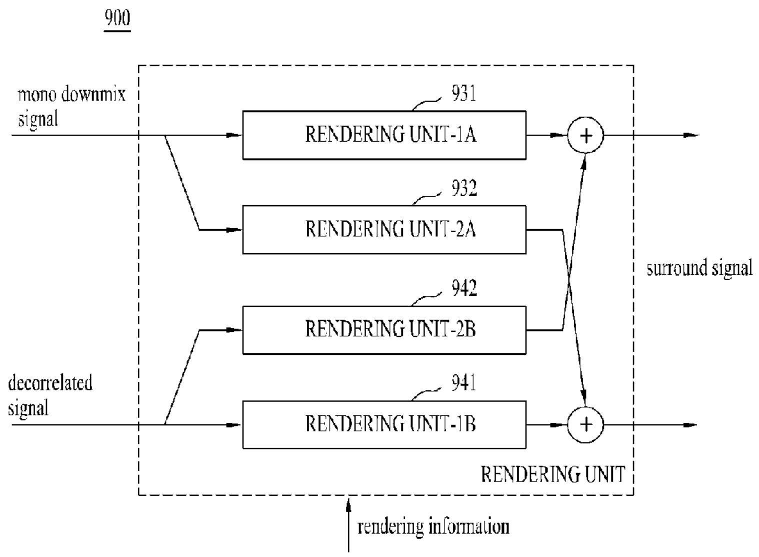

FIG. 8 and FIG. 9 are detailed block diagrams of a rendering unit for a mono downmix signal according to one embodiment of the present invention.

Referring to FIG. 8, the rendering unit 900 includes a rendering unit-A 930 and a rendering unit-B 940.

If a downmix signal is a mono signal, the spatial information converting unit 1000 generates rendering information HM_L and HM_R, in which the rendering information HM_L is used in rendering the mono signal to a left channel and the rendering information HM_R is used in rendering the mono signal to a right channel.

The rendering unit-A 930 applies the rendering information HM_L to the mono downmix signal to generate a surround signal of the left channel. The rendering unit-B 940 applies the rendering information HM_R to the mono downmix signal to generate a surround signal of the right channel.

The rendering unit 900 in the drawing does not use a decorrelator. Yet, if the rendering unit-A 930 and the rendering unit-B 940 performs rendering by using the rendering information Hmoverall_R and Hmoverall_L defined in Math Figure 12, respectively, it is able to obtain the outputs to which the decorrelator is applied, respectively.

Meanwhile, in case of attempting to obtain an output in a stereo signal instead of a surround signal after completion of the rendering performed on a mono downmix signal, the following two methods are possible.

The first method is that instead of using rendering information for a surround effect, a value used for a stereo output is used. In this case, it is able to obtain a stereo signal by modifying only the rendering information in the structure shown in FIG. 3.

The second method is that in a decoding process for generating a multi-channel signal by using a downmix signal and spatial information, it is able to obtain a stereo signal by performing the decoding process to only a corresponding step to obtain a specific channel number.

Referring to FIG. 9, the rendering unit 900 corresponds to a case in which a decorrelated signal is represented as one, i.e., Math Figure 11. The rendering unit 900 includes a rendering unit-1A 931, a rendering unit-2A 932, a rendering unit-1B 941, and a rendering unit-2B 942. The rendering unit 900 is similar to the rendering unit for the stereo downmix signal except that the rendering unit 900 includes the rendering units 941 and 942 for a decorrelated signal.

In case of the stereo downmix signal, it can be interpreted that one of two channels is a decorrelated signal. So, without employing additional decorrelators, it is able to perform a rendering process by using the formerly defined four kinds of rendering information HL_L, HL_R and the like. In particular, the rendering unit-1A 931 generates a signal to be delivered to a same channel by applying the rendering information HM_L to a mono downmix signal. The rendering unit-2A 932 generates a signal to be delivered to another channel by applying the rendering information HM_R to the mono downmix signal. The rendering unit-1B 941 generates a signal to be delivered to a same channel by applying the rendering information HMD_R to a decorrelated signal. And, the rendering unit-2B 942 generates a signal to be delivered to another channel by applying the rendering information HMD_L to the decorrelated signal.

Figure 19:
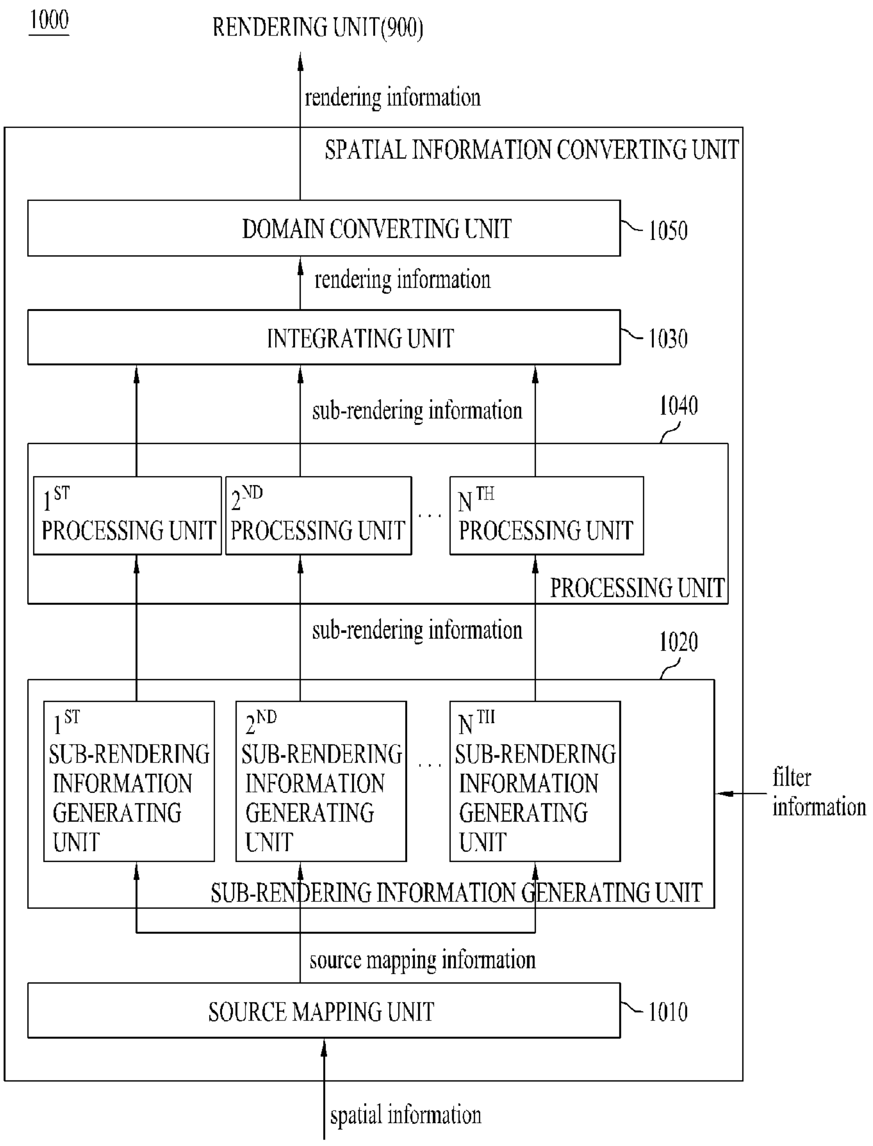
FIG. 19 is a block diagram for a second method of generating rendering filter information in a spatial information converting unit according to one embodiment of the present invention.

If a downmix signal is a mono signal, a downmix signal defined as x, source channel information defined as D, prototype filter information defined as G, a multi-channel signal defined as p, and a surround signal defined as y can be represented by matrixes shown in Math Figure 19.

MathFigure 19

$$x = [Mi],$$

$$p = \begin{bmatrix} L \\ Ls \\ R \\ Rs \\ C \\ LFE \end{bmatrix},$$

$$D = \begin{bmatrix} \text{D\_L} \\ \text{D\_Ls} \\ \text{D\_R} \\ \text{D\_Rs} \\ \text{D\_C} \\ \text{D\_LFE} \end{bmatrix}$$

$$G = \begin{bmatrix} \text{GL\_L} & \text{GLs\_L} & \text{GR\_L} & \text{GRs\_L} & \text{GC\_L} & \text{GLFE\_L} \\ \text{GL\_R} & \text{GLs\_R} & \text{GR\_R} & \text{GRs\_R} & \text{GC\_R} & \text{GLFE\_R} \end{bmatrix},$$

$$y = \begin{bmatrix} Lo \\ Ro \end{bmatrix}$$

In this case, the relation between the matrixes is similar to that of the case that the downmix signal is the stereo signal. So its details are omitted.

Meanwhile, the source mapping information described with reference to FIG. 4 and FIG. 5 and the rendering information generated by using the source mapping information have values differing per frequency band, parameter band, and/or transmitted timeslot. In this case, if a value of the source mapping information and/or the rendering information has a considerably big difference between neighbor bands or between boundary timeslots, distortion may take place in the rendering process. To prevent the distortion, a smoothing process on a frequency and/or time domain is needed. Another smoothing method suitable for the rendering is usable as well as the frequency domain smoothing and/or the time domain smoothing. And, it is able to use a value resulting from multiplying the source mapping information or the rendering information by a specific gain.

FIG. 10 and FIG. 11 are block diagrams of a smoothing unit and an expanding unit according to one embodiment of the present invention.

A smoothing method according to the present invention, as shown in FIG. 10 and FIG. 11, is applicable to rendering information and/or source mapping information. Yet, the smoothing method is applicable to other type information. In the following description, smoothing on a frequency domain is described. Yet, the present invention includes time domain smoothing as well as the frequency domain smoothing.

Referring to FIG. 10 and FIG. 11, the smoothing unit 1042 is capable of performing smoothing on rendering information and/or source mapping information. A detailed example of a position of the smoothing occurrence will be described with reference to FIGS. 18 to 20 later.

The smoothing unit 1042 can be configured with an expanding unit 1043, in which the rendering information and/or source mapping information can be expanded into a wider range, for example filter band, than that of a parameter band. In particular, the source mapping information can be expanded to a frequency resolution (e.g., filter band) corresponding to filter information to be multiplied by the filter information (e.g., HRTF filter coefficient). The smoothing according to the present invention is executed prior to or together with the expansion. The smoothing used together with the expansion can employ one of the methods shown in FIGS. 12 to 16.

Figure 12:
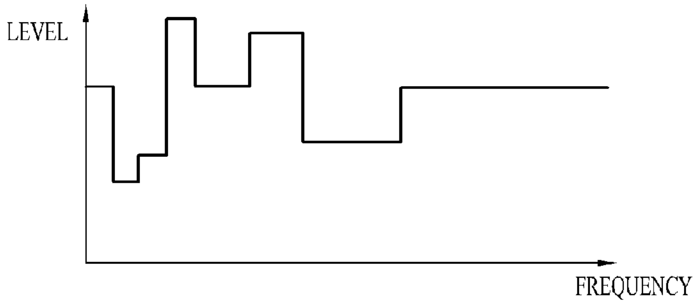
FIG. 12 is a graph to explain a first smoothing method according to one embodiment of the present invention.

FIG. 12 is a graph to explain a first smoothing method according to one embodiment of the present invention.

Referring to FIG. 12, a first smoothing method uses a value having the same size as spatial information in each parameter band. In this case, it is able to achieve a smoothing effect by using a suitable smoothing function.

FIG. 13 is a graph to explain a second smoothing method according to one embodiment of the present invention.

Referring to FIG. 13, a second smoothing method is to obtain a smoothing effect by connecting representative positions of parameter band. The representative position is a right center of each of the parameter bands, a central position proportional to a log scale, a bark scale, or the like, a lowest frequency value, or a position previously determined by a different method.

FIG. 14 is a graph to explain a third smoothing method according to one embodiment of the present invention.

Referring to FIG. 14, a third smoothing method is to perform smoothing in a form of a curve or straight line smoothly connecting boundaries of parameters. In this case, the third smoothing method uses a preset boundary smoothing curve or low pass filtering by the first order or higher IIR filter or FIR filter.

FIG. 15 is a graph to explain a fourth smoothing method according to one embodiment of the present invention.

Referring to FIG. 15, a fourth smoothing method is to achieve a smoothing effect by adding a signal such as a random noise to a spatial information contour. In this case, a value differing in channel or band is usable as the random noise. In case of adding a random noise on a frequency domain, it is able to add only a size value while leaving a phase value intact. The fourth smoothing method is able to achieve an inter-channel decorrelation effect as well as a smoothing effect on a frequency domain.

FIG. 16 is a graph to explain a fifth smoothing method according to one embodiment of the present invention.

Referring to FIG. 16, a fifth smoothing method is to use a combination of the second to fourth smoothing methods. For instance, after the representative positions of the respective parameter bands have been connected, the random noise is added and low path filtering is then applied. In doing so, the sequence can be modified. The fifth smoothing method minimizes discontinuous points on a frequency domain and an inter-channel decorrelation effect can be enhanced.

In the first to fifth smoothing methods, a total of powers for spatial information values (e.g., CLD values) on the respective frequency domains per channel should be uniform as a constant. For this, after the smoothing method is performed per channel, power normalization should be performed. For instance, if a downmix signal is a mono signal, level values of the respective channels should meet the relation of Math Figure 20.

$$D\_L(pb)+D\_R(pb)+D\_C(pb)+D\_Ls(pb)+D\_Rs(pb)+D\_Lfe(pb)=C \quad \text{MathFigure 20}$$

In this case, 'pb=0~ total parameter band number 1' and 'C' is an arbitrary constant.

FIG. 17 is a diagram to explain prototype filter information per channel.

Referring to FIG. 17, for rendering, a signal having passed through GL_L filter for a left channel source is sent to a left output, whereas a signal having passed through GL_R filter is sent to a right output.

Subsequently, a left final output (e.g., Lo) and a right final output (e.g., Ro) are generated by adding all signals received from the respective channels. In particular, the rendered left/right channel outputs can be expressed as Math Figure 21.

$$Lo=L*GL\_L+C*G\_L+R*GR\_L+Ls*GLs\_L+Rs*GRs\_L$$

$$Ro=L*GL\_R+C*GC\_R+R*GR\_R+Ls*GLs\_R+Rs*GRs\_R \quad \text{MathFigure 21}$$

In the present invention, the rendered left/right channel outputs can be generated by using the L, R, C, Ls, and Rs generated by decoding the downmix signal into the multi-channel signal using the spatial information. And, the present invention is able to generate the rendered left/right channel outputs using the rendering information without generating the L, R, C, Ls, and Rs, in which the rendering information is generated by using the spatial information and the filter information.

A process for generating rendering information using spatial information is explained with reference to FIGS. 18 to 20 as follows.

FIG. 18 is a block diagram for a first method of generating rendering information in a spatial information converting unit 900 according to one embodiment of the present invention.

Referring to FIG. 18, as mentioned in the foregoing description, the spatial information converting unit 900 includes the source mapping unit 1010, the sub-rendering information generating unit 1020, the integrating unit 1030, the processing unit 1040, and the domain converting unit 1050. The spatial information converting unit 900 has the same configuration shown in FIG. 3.

The sub-rendering information generating unit 1020 includes at least one or more sub-rendering information generating units ($1^{st}$ sub-rendering information generating unit to $N^{th}$ sub-rendering information generating unit).

The sub-rendering information generating unit 1020 generates sub-rendering information by using filter information and source mapping information.

For instance, if a downmix signal is a mono signal, the first sub-rendering information generating unit is able to generate sub-rendering information corresponding to a left channel on a multi-channel. And, the sub-rendering information can be represented as Math Figure 22 using the source mapping information D_L and the converted filter information GL_L' and GL_R'

$$FL\_L=D\_L*GL\_L' \text{(mono input→filter coefficient to left output channel)}$$

$$FL\_R=D\_L*GL\_R' \text{(mono input→filter coefficient to right output channel)} \quad \text{MathFigure 22}$$

In this case, the D_L is a value generated by using the spatial information in the source mapping unit 1010. Yet, a process for generating the D_L can follow the tree structure.

The second sub-rendering information generating unit is able to generate sub-rendering information FR_L and FR_R corresponding to a right channel on the multi-channel. And, the $N^{th}$ sub-rendering information generating unit is able to generate sub-rendering information FRs_L and FRs_R corresponding to a right surround channel on the multi-channel.

If a downmix signal is a stereo signal, the first sub-rendering information generating unit is able to generate sub-rendering information corresponding to the left channel on the multi-channel. And, the sub-rendering information can be represented as Math Figure 23 by using the source mapping information D_L1 and D_L2.

$$FL\_L1=D\_L1*GL\_L'\text{(left input}\rightarrow\text{filter coefficient to left output channel)}$$

$$FL\_L2=D\_L2*GL\_L'\text{(right input}\rightarrow\text{filter coefficient to left output channel)}$$

$$FL\_R1=D\_L1*GL\_R'\text{(left input}\rightarrow\text{filter coefficient to right output channel)}$$

$$FL\_R2=D\_L2*GL\_R'\text{(right input}\rightarrow\text{filter coefficient to right output channel)}$$ MathFigure 23

In Math Figure 23, the FL_R1 is explained for example as follows.

First of all, in the FL_R1, 'L' indicates a position of the multi-channel, 'R' indicates an output channel of a surround signal, and '1' indicates a channel of the downmix signal. Namely, the FL_R1 indicates the sub-rendering information used in generating the right output channel of the surround signal from the left channel of the downmix signal.

Secondly, the D_L1 and the D_L2 are values generated by using the spatial information in the source mapping unit 1010.

If a downmix signal is a stereo signal, it is able to generate a plurality of sub-rendering informations from at least one sub-rendering information generating unit in the same manner of the case that the downmix signal is the mono signal. The types of the sub-rendering informations generated by a plurality of the sub-rendering information generating units are exemplary, which does not put limitation on the present invention.

The sub-rendering information generated by the sub-rendering information generating unit 1020 is transferred to the rendering unit 900 via the integrating unit 1030, the processing unit 1040, and the domain converting unit 1050.

The integrating unit 1030 integrates the sub-rendering informations generated per channel into rendering information (e.g., HL_L, HL_R, HR_L, HR_R) for a rendering process. An integrating process in the integrating unit 1030 is explained for a case of a mono signal and a case of a stereo signal as follows.

Figure 24:
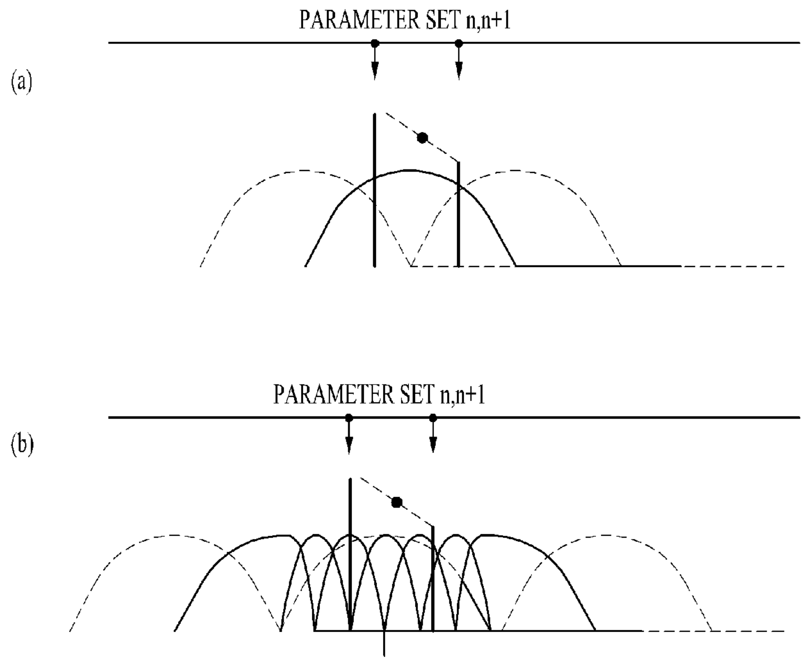
FIG. 24 is a diagram for a block switching method according to one embodiment of the present invention.

First of all, if a downmix signal is a mono signal, rendering information can be expressed as Math Figure 24.

$$HM\_L=FL\_L+FR\_L+FC\_L+FLs\_L+FRs\_L+FLFE\_L$$

$$HM\_R=FL\_R+FR\_R+FC\_R+FLs\_R+FRs\_R+FLFE\_R$$ MathFigure 24

Figure 25:
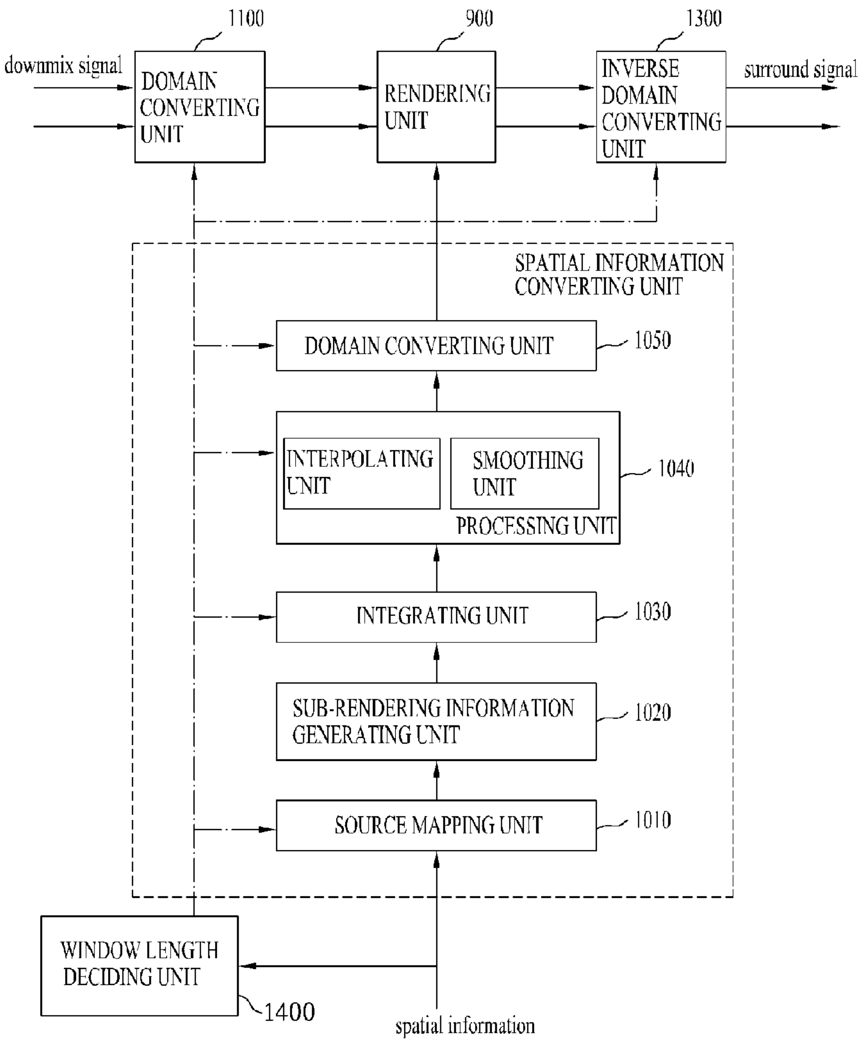
FIG. 25 is a block diagram for a position to which a window length decided by a window length deciding unit is applied according to one embodiment of the present invention.

Secondly, if a downmix signal is a stereo signal, rendering information can be expressed as Math Figure 25.

$$HL\_L=FL\_L1+FR\_L1+FC\_L1+FLs\_L1+FRs\_L1+FLFE\_L1$$

$$HR\_L=FL\_L2+FR\_L2+FC\_L2+FLs\_L2+FRs\_L2+FLFE\_L2$$

$$HL\_R=FL\_R1+FR\_R1+FC\_R1+FLs\_R1+FRs\_R1+FLFE\_R1$$

$$HR\_R=FL\_R2+FR\_R2+FC\_R2+FLs\_R2+FRs\_R2+FLFE\_R2$$ MathFigure 25

Subsequently, the processing unit 1040 includes an interpolating unit 1041 and/or a smoothing unit 1042 and performs interpolation and/or smoothing for the rendering information. The interpolation and/or smoothing can be executed on a time domain, a frequency domain, or a QMF domain. In the specification, the time domain is taken as an example, which does not put limitation on the present invention.

The interpolation is performed to obtain rendering information non-existing between the rendering informations if the transmitted rendering information has a wide interval on the time domain. For instance, assuming that rendering informations exist in an $n^{th}$ timeslot and an $(n+k)^{th}$ timeslot ($k>1$), respectively, it is able to perform linear interpolation on a not-transmitted timeslot by using the generated rendering informations (e.g., HL_L, HR_L, HL_R, HR_R).

The rendering information generated from the interpolation is explained with reference to a case that a downmix signal is a mono signal and a case that the downmix signal is a stereo signal.

Figure 26:
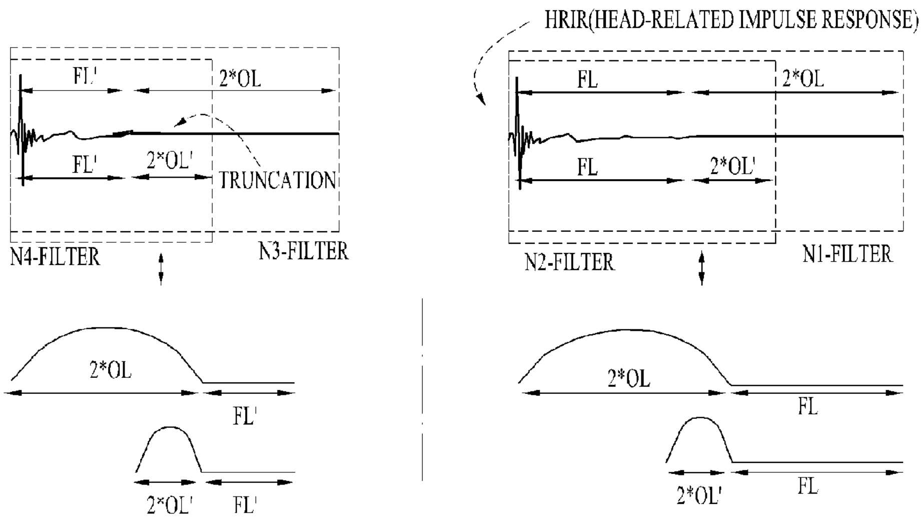
FIG. 26 is a diagram for filters having various lengths used in processing an audio signal according to one embodiment of the present invention.

If the downmix signal is the mono signal, the interpolated rendering information can be expressed as Math Figure 26.

$$HM\_L(n+j)=HM\_L(n)*(1-a)+HM\_L(n+k)*a$$

$$HM\_R(n+j)=HM\_R(n)*(1-a)+HM\_R(n+k)*a$$ MathFigure 26

Figure 27:
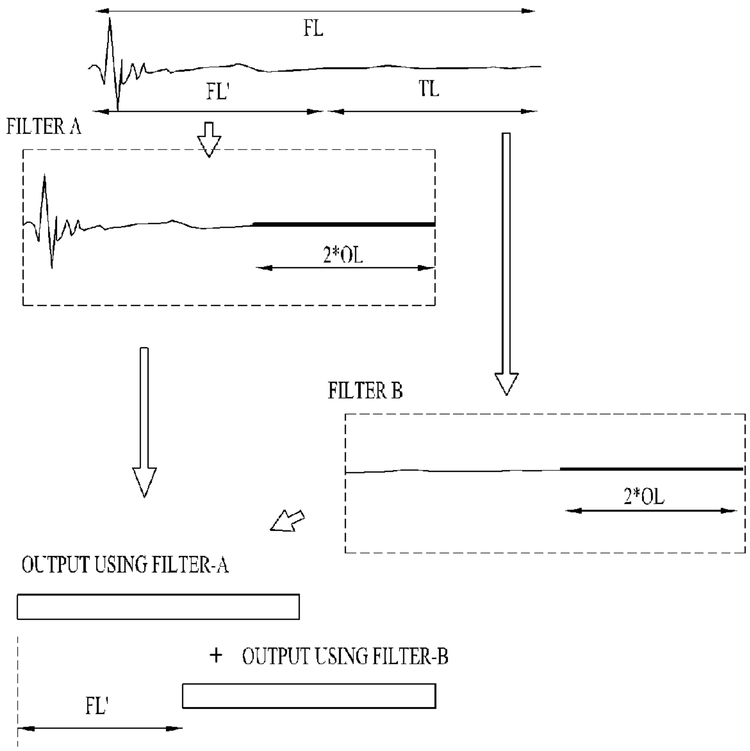
FIG. 27 is a diagram for a method of processing an audio signal dividedly by using a plurality of subfilters according to one embodiment of the present invention.

If the downmix signal is the stereo signal, the interpolated rendering information can be expressed as Math Figure 27.

$$HL\_L(n+j)=HL\_L(n)*(1-a)+HL\_L(n+k)*a$$

$$HR\_L(n+j)=HR\_L(n)*(1-a)+HR\_L(n+k)*a$$

$$HL\_R(n+j)=HL\_R(n)*(1-a)+HL\_R(n+k)*a$$

$$HR\_R(n+j)=HR\_R(n)*(1-a)+HR\_R(n+k)*a$$ MathFigure 27

In this case, it is $0<j<k$. 'j' and 'k' are integers. And, 'a' is a real number corresponding to '$0<a<1$' to be expressed as Math Figure 28.

$$a=j/k$$ MathFigure 28

Figure 28:
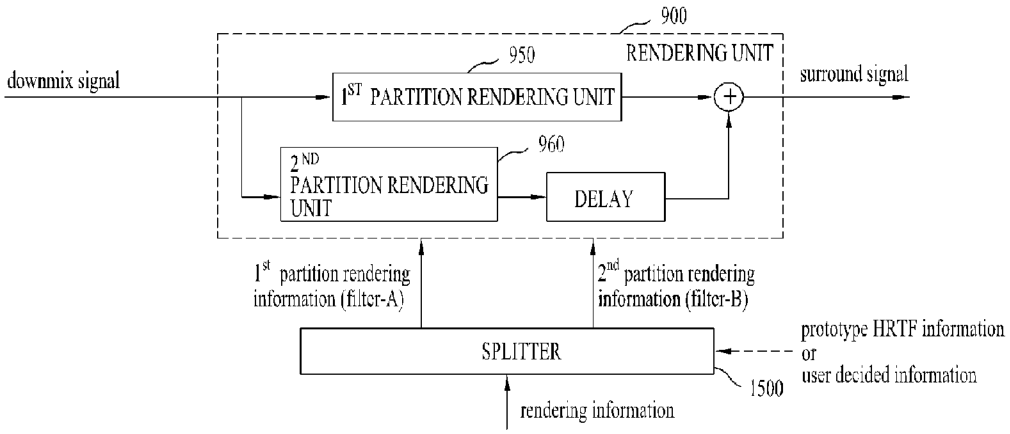
FIG. 28 is a block diagram for a method of rendering partition rendering information generated by a plurality of subfilters to a mono downmix signal according to one embodiment of the present invention.

If so, it is able to obtain a value corresponding to the not-transmitted timeslot on a straight line connecting the values in the two timeslots according to Math Figure 27 and Math Figure 28. Details of the interpolation will be explained with reference to FIG. 22 and FIG. 23 later.

In case that a filter coefficient value abruptly varies between two neighboring timeslots on a time domain, the smoothing unit 1042 executes smoothing to prevent a problem of distortion due to an occurrence of a discontinuous point. The smoothing on the time domain can be carried out using the smoothing method described with reference to FIGS. 12 to 16. The smoothing can be performed together with expansion. And, the smoothing may differ according to its applied position. If a downmix signal is a mono signal, the time domain smoothing can be represented as Math Figure 29.

$$HM\_L(n)'=HM\_L(n)*b+HM\_L(n-1)'*(1-b)$$

$$HM\_R(n)'=HM\_R(n)*b+HM\_R(n-1)'*(1-b)$$ MathFigure 29

Namely, the smoothing can be executed by the 1-pol IIR filter type performed in a manner of multiplying the rendering information HM_L(n−1) or HM_R(n−1) smoothed in a previous timeslot n−1 by (1−b), multiplying the rendering information HM_L(n) or HM)R(n) generated in a current timeslot n by b, and adding the two multiplications together. In this case, 'b' is a constant for $0<b<1$. If 'b' gets smaller, a smoothing effect becomes greater. If 'b' gets bigger, a smoothing effect becomes smaller. And, the rest of the filters can be applied in the same manner.

Figure 29:
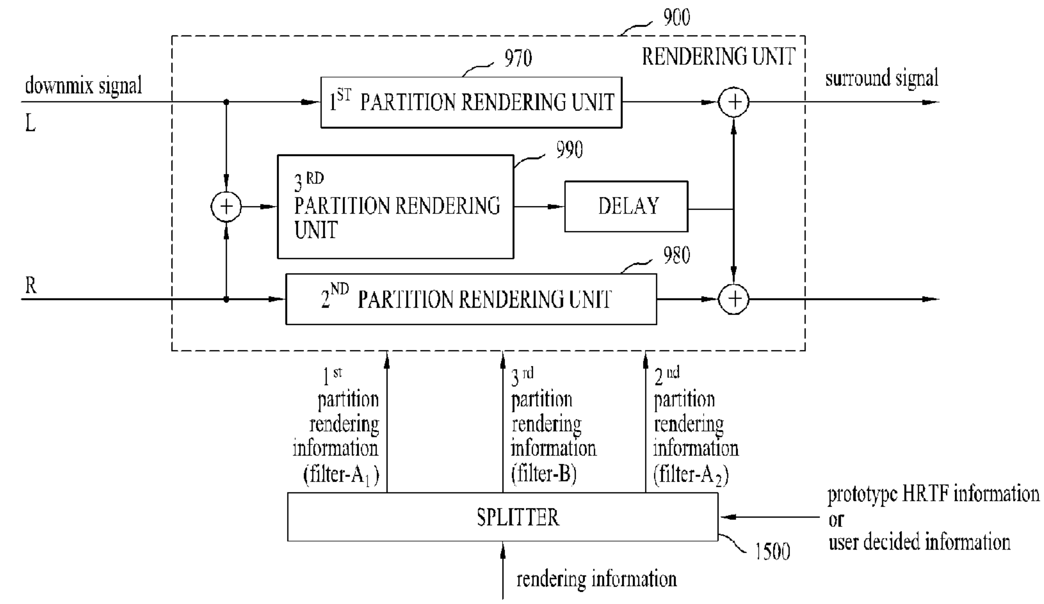
FIG. 29 is a block diagram for a method of rendering partition rendering information generated by a plurality of subfilters to a stereo downmix signal according to one embodiment of the present invention.
Figure 30:
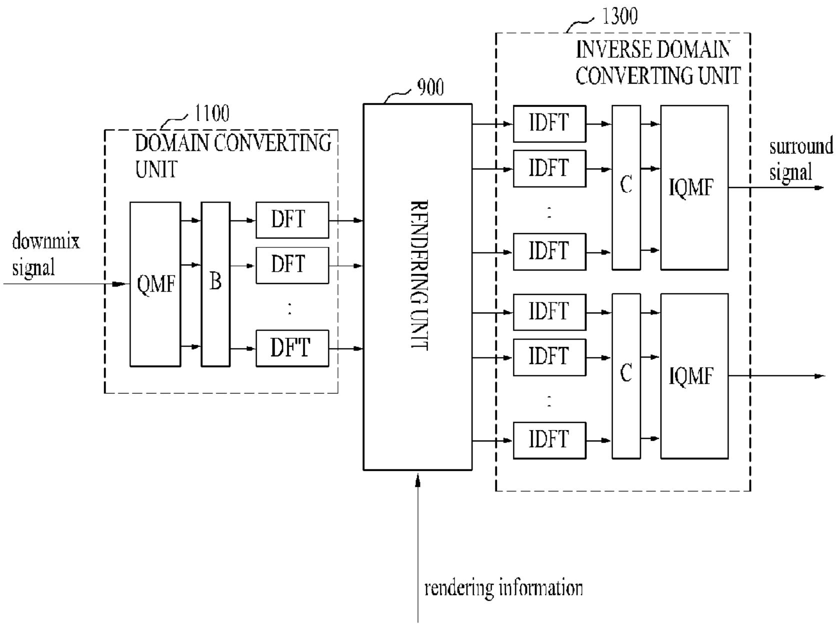
FIG. 30 is a block diagram for a first domain converting method of a downmix signal according to one embodiment of the present invention.

The interpolation and the smoothing can be represented as one expression shown in Math Figure 30 by using Math Figure 29 for the time domain smoothing.

$$HM\_L(n+j)'=(HM\_L(n)*(1-a)+HM\_L(n+k)*a)*b+HM\_L(n+j-1)'*(1-b)$$

$$HM\_R(n+j)'=(HM\_R(n)*(1-a)+HM\_R(n+k)*a)*b+HM\_R(n+j-1)'*(1-b)$$ MathFigure 30

If the interpolation is performed by the interpolating unit 1041 and/or if the smoothing is performed by the smoothing unit 1042, rendering information having an energy value different from that of prototype rendering information may be obtained. To prevent this problem, energy normalization may be executed in addition.

Finally, the domain converting unit 1050 performs domain conversion on the rendering information for a domain for executing the rendering. If the domain for executing the rendering is identical to the domain of rendering information, the domain conversion may not be executed. Thereafter, the domain-converted rendering information is transferred to the rendering unit 900.

FIG. 19 is a block diagram for a second method of generating rendering information in a spatial information converting unit according to one embodiment of the present invention.

The second method is similar to the first method in that a spatial information converting unit 1000 includes a source mapping unit 1010, a sub-rendering information generating unit 1020, an integrating unit 1030, a processing unit 1040, and a domain converting unit 1050 and in that the sub-rendering information generating unit 1020 includes at least one sub-rendering information generating unit.

Referring to FIG. 19, the second method of generating the rendering information differs from the first method in a position of the processing unit 1040. So, interpolation and/or smoothing can be performed per channel on sub-rendering informations (e.g., FL_L and FL_R in case of mono signal or FL_L1, FL_L2, FL_R1, FL_R2 in case of stereo signal) generated per channel in the sub-rendering information generating unit 1020.

Subsequently, the integrating unit 1030 integrates the interpolated and/or smoothed sub-rendering informations into rendering information.

The generated rendering information is transferred to the rendering unit 900 via the domain converting unit 1050.

Figure 20:
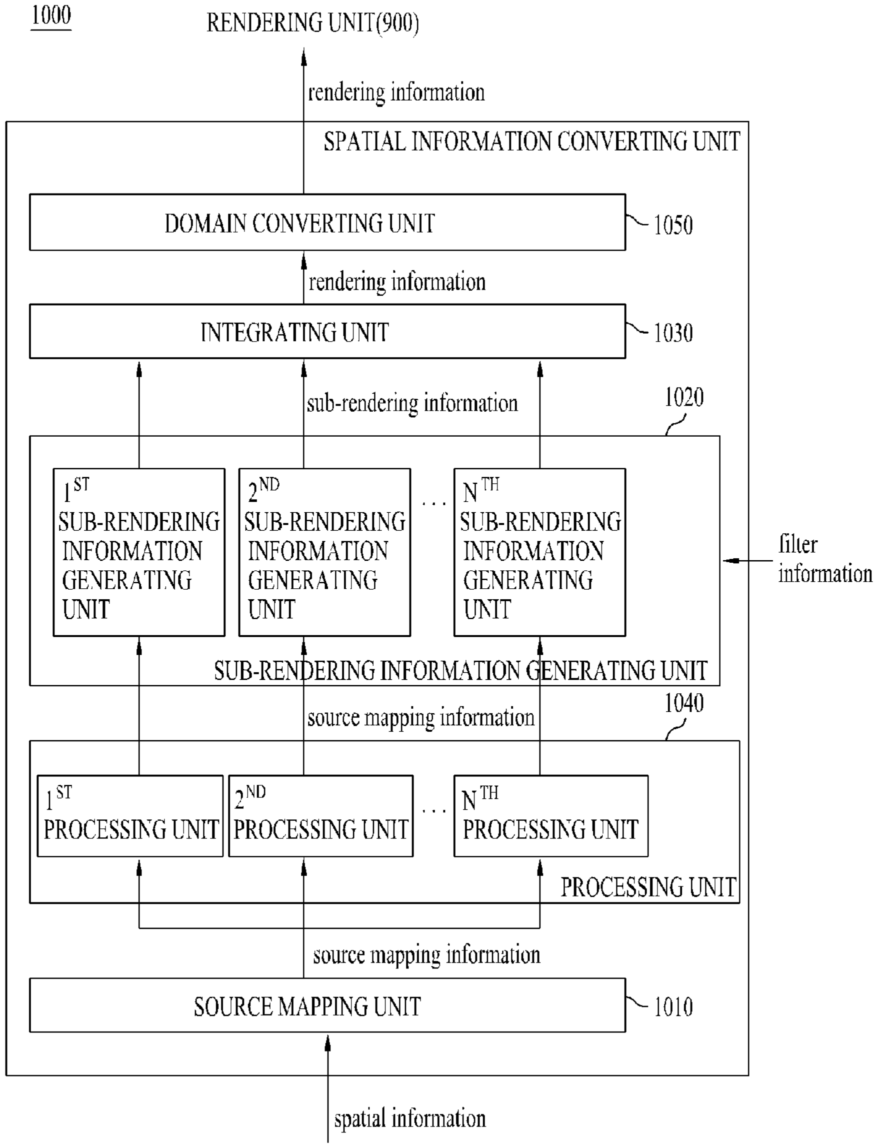
FIG. 20 is a block diagram for a third method of generating rendering filter information in a spatial information converting unit according to one embodiment of the present invention.

FIG. 20 is a block diagram for a third method of generating rendering filter information in a spatial information converting unit according to one embodiment of the present invention.

The third method is similar to the first or second method in that a spatial information converting unit 1000 includes a source mapping unit 1010, a sub-rendering information generating unit 1020, an integrating unit 1030, a processing unit 1040, and a domain converting unit 1050 and in that the sub-rendering information generating unit 1020 includes at least one sub-rendering information generating unit.

Referring to FIG. 20, the third method of generating the rendering information differs from the first or second method in that the processing unit 1040 is located next to the source mapping unit 1010. So, interpolation and/or smoothing can be performed per channel on source mapping information generated by using spatial information in the source mapping unit 1010.

Subsequently, the sub-rendering information generating unit 1020 generates sub-rendering information by using the interpolated and/or smoothed source mapping information and filter information.

The sub-rendering information is integrated into rendering information in the integrating unit 1030. And, the generated rendering information is transferred to the rendering unit 900 via the domain converting unit 1050.

Figure 21:
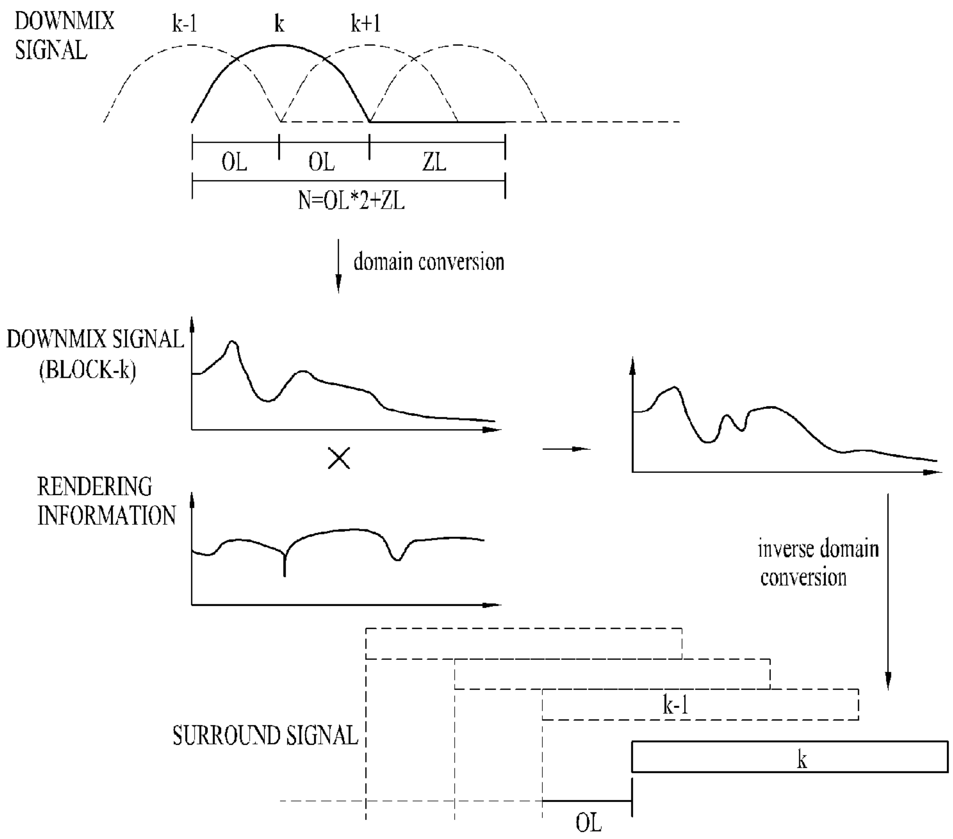
FIG. 21 is a diagram to explain a method of generating a surround signal in a rendering unit according to one embodiment of the present invention.

FIG. 21 is a diagram to explain a method of generating a surround signal in a rendering unit according to one embodiment of the present invention. FIG. 21 shows a rendering process executed on a DFT domain. Yet, the rendering process can be implemented on a different domain in a similar manner as well. FIG. 21 shows a case that an input signal is a mono downmix signal. Yet, FIG. 21 is applicable to other input channels including a stereo downmix signal and the like in the same manner.

Referring to FIG. 21, a mono downmix signal on a time domain preferentially executes windowing having an overlap interval OL in the domain converting unit. FIG. 21 shows a case that 50% overlap is used. Yet, the present invention includes cases of using other overlaps.

A window function for executing the windowing can employ a function having a good frequency selectivity on a DFT domain by being seamlessly connected without discontinuity on a time domain. For instance, a sine square window function can be used as the window function.

Subsequently, zero padding ZL of a tab length [precisely, (tab length)−1] of a rendering filter using rendering information converted in the domain converting unit is performed on a mono downmix signal having a length OL*2 obtained from the windowing. A domain conversion is then performed into a DFT domain. FIG. 20 shows that a block-k downmix signal is domain-converted into a DFT domain.

The domain-converted downmix signal is rendered by a rendering filter that uses rendering information. The rendering process can be represented as a product of a downmix signal and rendering information. The rendered downmix signal undergoes IDFT (Inverse Discrete Fourier Transform) in the inverse domain converting unit and is then overlapped with the downmix signal (block k−1 in FIG. 20) previously executed with a delay of a length OL to generate a surround signal.

Interpolation can be performed on each block undergoing the rendering process. The interpolating method is explained as follows.

Figure 22:
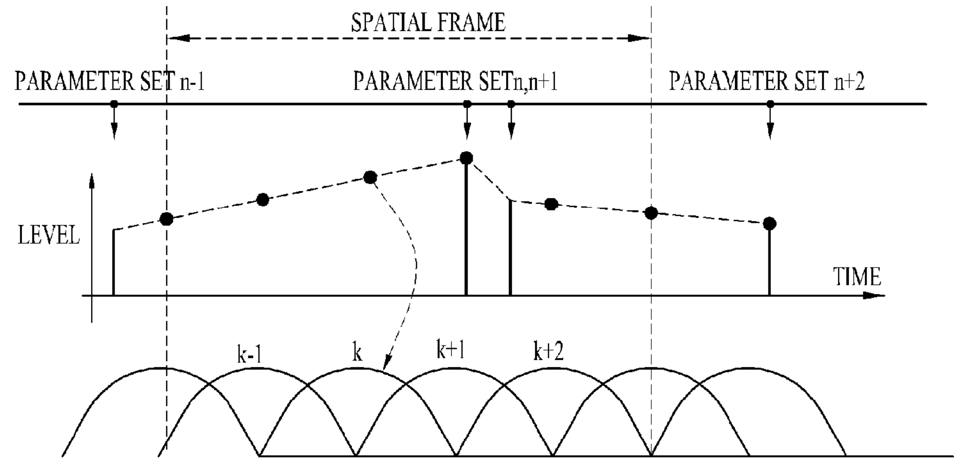
FIG. 22 is a diagram for a first interpolating method according to one embodiment of the present invention.

FIG. 22 is a diagram for a first interpolating method according to one embodiment of the present invention. Interpolation according to the present invention can be executed on various positions. For instance, the interpolation can be executed on various positions in the spatial information converting unit shown in FIGS. 18 to 20 or can be executed in the rendering unit. Spatial information, source mapping information, filter information and the like can be used as the values to be interpolated. In the specification, the spatial information is exemplarily used for description. Yet, the present invention is not limited to the spatial information. The interpolation is executed after or together with expansion to a wider band.

Referring to FIG. 22, spatial information transferred from an encoding apparatus c an be transferred from a random position instead of being transmitted each timeslot. One spatial frame is able to carry a plurality of spatial information sets (e.g., parameter sets n and n+1 in FIG. 22). In case of a low bit rate, one spatial frame is able to carry a single new spatial information set. So, interpolation is carried out for a not-transmitted timeslot using values of a neighboring transmitted spatial information set. An interval between windows for executing rendering does not always match a timeslot. So, an interpolated value at a center of the rendering windows (K−1, K, K+1, K+2, etc.), as shown in FIG. 22, is found to use. Although FIG. 22 shows that linear interpolation is carried out between timeslots where a spatial information set exists, the present invention is not limited to the interpolating method. For instance, interpolation is not carried out on a timeslot where a spatial information set does not exist. Instead, a previous or preset value can be used.

Figure 23:
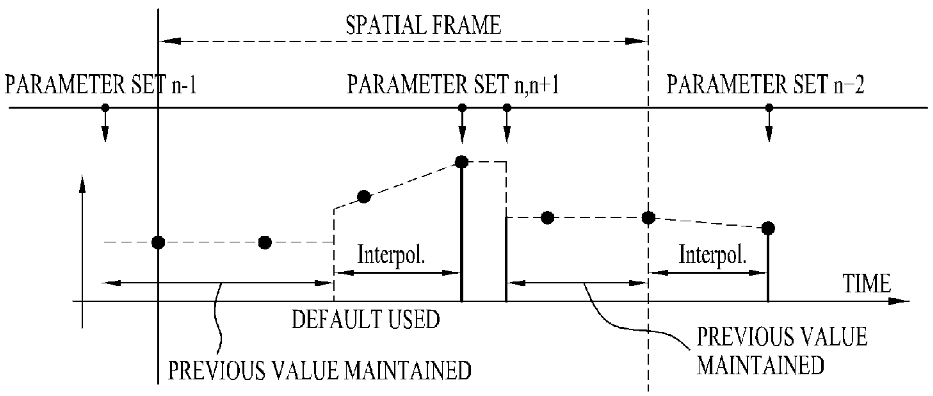
FIG. 23 is a diagram for a second interpolating method according to one embodiment of the present invention.

FIG. 23 is a diagram for a second interpolating method according to one embodiment of the present invention.

Referring to FIG. 23, a second interpolating method according to one embodiment of the present invention has a structure that an interval using a previous value, an interval using a preset default value and the like are combined. For instance, interpolation can be performed by using at least one of a method of maintaining a previous value, a method of using a preset default value, and a method of executing linear interpolation in an interval of one spatial frame. In case that at least two new spatial information sets exist in one window, distortion may take place. In the following description, block switching for preventing the distortion is explained.

FIG. 24 is a diagram for a block switching method according to one embodiment of the present invention.

Referring to (a) shown in FIG. 24, since a window length is greater than a timeslot length, at least two spatial information sets (e.g., parameter sets n and n+1 in FIG. 24) can exist in one window interval. In this case, each of the spatial information sets should be applied to a different timeslot. Yet, if one value resulting from interpolating the at least two spatial information sets is applied, distortion may take place. Namely, distortion attributed to time resolution shortage according to a window length can take place.

To solve this problem, a switching method of varying a window size to fit resolution of a timeslot can be used. For instance, a window size, as shown in (b) of FIG. 24, can be switched to a shorter-sized window for an interval requesting a high resolution. In this case, at a beginning and an ending portion of switched windows, connecting windows is used to prevent seams from occurring on a time domain of the switched windows.

The window length can be decided by using spatial information in a decoding apparatus instead of being transferred as separate additional information. For instance, a window length can be determined by using an interval of a timeslot for updating spatial information. Namely, if the interval for updating the spatial information is narrow, a window function of short length is used. If the interval for updating the spatial information is wide, a window function of long length is used. In this case, by using a variable length window in rendering, it is advantageous not to use bits for sending window length information separately. Two types of window length are shown in (b) of FIG. 24. Yet, windows having various lengths can be used according to transmission frequency and relations of spatial information. The decided window length information is applicable to various steps for generating a surround signal, which is explained in the following description.

FIG. 25 is a block diagram for a position to which a window length decided by a window length deciding unit is applied according to one embodiment of the present invention.

Referring to FIG. 25, a window length deciding unit 1400 is able to decide a window length by using spatial information. Information for the decided window length is applicable to a source mapping unit 1010, an integrating unit 1030, a processing unit 1040, domain converting units 1050 and 1100, and a inverse domain converting unit 1300. FIG. 25 shows a case that a stereo downmix signal is used. Yet, the present invention is not limited to the stereo downmix signal only. As mentioned in the foregoing description, even if a window length is shortened, a length of zero padding decided according to a filter tab number is not adjustable. So, a solution for the problem is explained in the following description.

FIG. 26 is a diagram for filters having various lengths used in processing an audio signal according to one embodiment of the present invention. As mentioned in the foregoing description, if a length of zero padding decided according to a filter tab number is not adjusted, an overlapping amounting to a corresponding length sub-stantially occurs to bring about time resolution shortage. A solution for the problem is to reduce the length of the zero padding by restricting a length of a filter tab. A method of reducing the length of the zero padding can be achieved by truncating a rear portion of a response (e.g., a diffusing interval corresponding to reverberation). In this case, a rendering process may be less accurate than a case of not truncating the rear portion of the filter response. Yet, filter coefficient values on a time domain are very small to mainly affect reverberation. So, a sound quality is not considerably affected by the truncating.

Referring to FIG. 26, four kinds of filters are usable. The four kinds of the filters are usable on a DFT domain, which does not put limitation on the present invention.

A filter-N indicates a filter having a long filter length FL and a length 2*OL of a long zero padding of which filter tab number is not restricted. A filter-N2 indicates a filter having a zero padding length 2*OL shorter than that of the filter-N1 by restricting a tab number of filter with the same filter length FL. A filter-N3 indicates a filter having a long zero padding length 2*OL by not restricting a tab number of filter with a filter length FL shorter than that of the filter-N1. And, a filter-N4 indicates a filter having a window length FL shorter than that of the filter-N1 with a short zero padding length 2*OL by restricting a tab number of filter.

As mentioned in the foregoing description, it is able to solve the problem of time resolution using the above exemplary four kinds of the filters. And, for the rear portion of the filter response, a different filter coefficient is usable for each domain.

FIG. 27 is a diagram for a method of processing an audio signal dividedly by using a plurality of subfilters according to one embodiment of the present invention. one filter may be divided into subfilters having filter coefficients differing from each other. After processing the audio signal by using the subfilters, a method of adding results of the processing can be used. In case applying spatial information to a rear portion of a filter response having small energy, i.e., in case of performing rendering by using a filter with a long filter tab, the method provides function for processing dividedly the audio signal by a predetermined length unit. For instance, since the rear portion of the filter response is not considerably varied per HRTF corresponding to each channel, it is able to perform the rendering by extracting a coefficient common to a plurality of windows. In the present specification, a case of execution on a DFT domain is described. Yet, the present invention is not limited to the DFT domain.

Referring to FIG. 27, after one filter FL has been divided into a plurality of sub-areas, a plurality of the sub-areas can be processed by a plurality of subfilters (filter-A and filter-B) having filter coefficients differing from each other.

Subsequently, an output processed by the filter-A and an output processed by the filter-B are combined together. For instance, IDFT (Inverse Discrete Fourier Transform) is performed on each of the output processed by the filter-A and the output processed by the filter-B to generate a time domain signal. And, the generated signals are added together. In this case, a position, to which the output processed by the filter-B is added, is time-delayed by FL more than a position of the output processed by the filter-A. In this way, the signal processed by a plurality of the subfilters brings the same effect of the case that the signal is processed by a single filter.

And, the present invention includes a method of rendering the output processed by the filter-B to a downmix signal directly. In this case, it is able to render the output to the downmix signal by using coefficients extracting from spatial information, the spatial information in part or without using the spatial information.

The method is characterized in that a filter having a long tab number can be applied dividedly and that a rear portion of the filter having small energy is applicable without conversion using spatial information. In this case, if conversion using spatial information is not applied, a different filter is not applied to each processed window. So, it is unnecessary to apply the same scheme as the block switching. FIG. 26 shows that the filter is divided into two areas. Yet, the present invention is able to divide the filter into a plurality of areas.

FIG. 28 is a block diagram for a method of rendering partition rendering information generated by a plurality of subfilters to a mono downmix signal according to one embodiment of the present invention. FIG. 28 relates to one rendering coefficient. The method can be executed per rendering coefficient.

Referring to FIG. 28, the filter-A information of FIG. 27 corresponds to first partition rendering information HM_L_A and the filter-B information of FIG. 27 corresponds to second partition rendering information HM_L_B. FIG. 28 shows an embodiment of partition into two subfilters. Yet, the present invention is not limited to the two subfilters. The two subfilters can be obtained via a splitting unit 1500 using the rendering information HM_L generated in the spatial information generating unit 1000. Alternatively, the two subfilters can be obtained using prototype HRTF information or information decided according to a user's selection. The information decided according to a user's selection may include spatial information selected according to a user's taste for example. In this case, HM_L_A is the rendering information based on the received spatial information. and, HM_L_B may be the rendering information for providing a 3-dimensional effect commonly applied to signals.

As mentioned in the foregoing description, the processing with a plurality of the subfilters is applicable to a time domain and a QMF domain as well as the DFT domain. In particular, the coefficient values split by the filter-A and the filter-B are applied to the downmix signal by time or QMF domain rendering and are then added to generate a final signal.

The rendering unit 900 includes a first partition rendering unit 950 and a second partition rendering unit 960. The first partition rendering unit 950 performs a rendering process using HM_L_A, whereas the second partition rendering unit 960 performs a rendering process using HM_L_B.

If the filter-A and the filter-B, as shown in FIG. 27, are splits of a same filter according to time, it is able to consider a proper delay to correspond to the time interval. FIG. 28 shows an example of a mono downmix signal. In case of using mono downmix signal and decorrelator, a portion corresponding to the filter-B is applied not to the decorrelator but to the mono downmix signal directly.

FIG. 29 is a block diagram for a method of rendering partition rendering information generated using a plurality of subfilters to a stereo downmix signal according to one embodiment of the present invention.

A partition rendering process shown in FIG. 29 is similar to that of FIG. 28 in that two subfilters are obtained in a splitter 1500 by using rendering information generated by the spatial information converting unit 1000, prototype HRTF filter information or user decision information. The difference from FIG. 28 lies in that a partition rendering process corresponding to the filter-B is commonly applied to L/R signals.

In particular, the splitter 1500 generates first partition rendering information corresponding to filter-A information, second partition rendering information, and third partition rendering information corresponding to filter-B information. In this case, the third partition rendering information can be generated by using filter information or spatial information commonly applicable to the L/R signals.

Referring to FIG. 29, a rendering unit 900 includes a first partition rendering unit 970, a second partition rendering unit 980, and a third partition rendering unit 990.

The third partition rendering information generates is applied to a sum signal of the L/R signals in the third partition rendering unit 990 to generate one output signal. The output signal is added to the L/R output signals, which are independently rendered by a filter-A1 and a filter-A2 in the first and second partition rendering units 970 and 980, respectively, to generate surround signals. In this case, the output signal of the third partition rendering unit 990 can be added after an appropriate delay. In FIG. 29, an expression of cross rendering information applied to another channel from L/R inputs is omitted for convenience of explanation.

FIG. 30 is a block diagram for a first domain converting method of a downmix signal according to one embodiment of the present invention. The rendering process executed on the DFT domain has been described so far. As mentioned in the foregoing description, the rendering process is executable on other domains as well as the DFT domain. Yet, FIG. 30 shows the rendering process executed on the DFT domain. A domain converting unit 1100 includes a QMF filter and a DFT filter. An inverse domain converting unit 1300 includes an IDFT filter and an IQMF filter. FIG. 30 relates to a mono downmix signal, which does not put limitation on the present invention.

Referring to FIG. 30, a time domain downmix signal of p samples passes through a QMF filter to generate P sub-band samples. W samples are recollected per band. After windowing is performed on the recollected samples, zero padding is performed. M-point DFT (FFT) is then executed. In this case, the DFT enables a processing by the aforesaid type windowing. A value connecting the M/2 frequency domain values per band obtained by the M-point DFT to P bands can be regarded as an approximate value of a frequency spectrum obtained by M/2*P-point DFT. So, a filter coefficient represented on a M/2*P-point DFT domain is multiplied by the frequency spectrum to bring the same effect of the rendering process on the DFT domain.

In this case, the signal having passed through the QMF filter has leakage, e.g., aliasing between neighboring bands. In particular, a value corresponding to a neighbor band smears in a current band and a portion of a value existing in the current band is shifted to the neighbor band. In this case, if QMF integration is executed, an original signal can be recovered due to QMF characteristics. Yet, if a filtering process is performed on the signal of the corresponding band as the case in the present invention, the signal is distorted by the leakage. To minimize this problem, a process for recovering an original signal can be added in a manner of having a signal pass through a leakage minimizing butterfly B prior to performing DFT per band after QMF in the domain converting unit 100 and performing a reversing process V after IDFT in the inverse domain converting unit 1300.

Meanwhile, to match the generating process of the rendering information generated in the spatial information converting unit 1000 with the generating process of the downmix signal, DFT can be performed on a QMF pass signal for prototype filter information instead of executing M/2*P-point DFT in the beginning. In this case, delay and data spreading due to QMF filter may exist.

Figure 31:
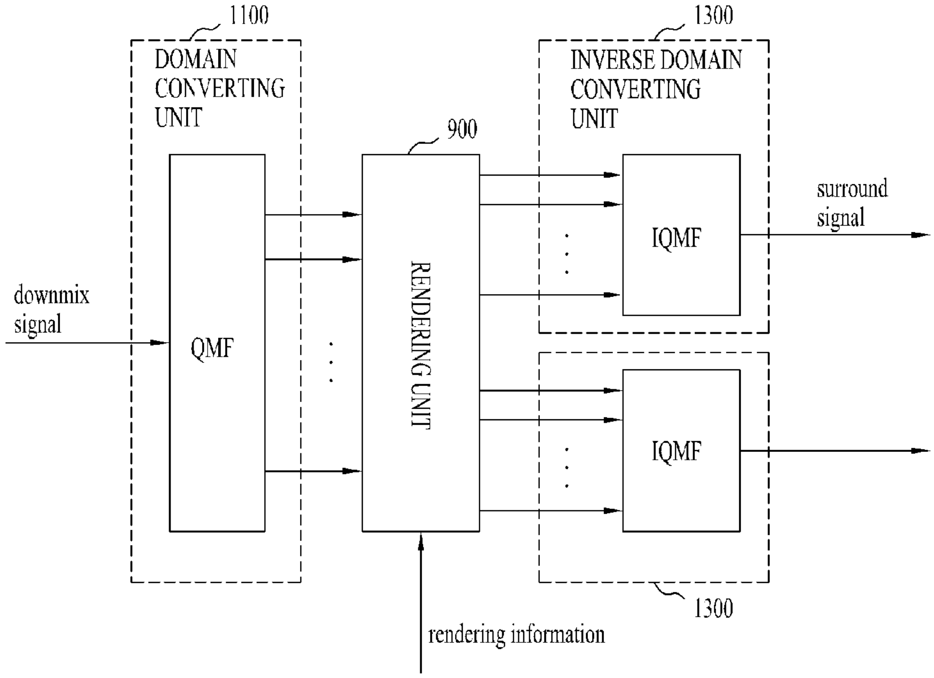
FIG. 31 is a block diagram for a second domain converting method of a downmix signal according to one embodiment of the present invention.

FIG. 31 is a block diagram for a second domain converting method of a downmix signal according to one embodiment of the present invention. FIG. 31 shows a rendering process performed on a QMF domain.

Referring to FIG. 31, a domain converting unit 1100 includes a QMF domain converting unit and an inverse domain converting unit 1300 includes an IQMF domain converting unit. A configuration shown in FIG. 31 is equal to that of the case of using DFT only except that the domain converting unit is a QMF filter. In the following description, the QMF is referred to as including a QMF and a hybrid QMF having the same bandwidth. The difference from the case of using DFT only lies in that the generation of the rendering information is performed on the QMF domain and that the rendering process is represented as a convolution instead of the product on the DFT domain, since the rendering process performed by a renderer-M 3012 is executed on the QMF domain.

Assuming that the QMF filter is provided with B bands, a filter coefficient can be represented as a set of filter coefficients having different features (coefficients) for the B bands. Occasionally, if a filter tab number becomes a first order (i.e., multiplied by a constant), a rendering process on a DFT domain having B frequency spectrums and an operational process are matched. Math Figure 31 represents a rendering process executed in one QMF band (b) for one path for performing the rendering process using rendering information HM_L.

$$Lo\_m_b(k) = HM\_L_b * m = \sum_{i=0}^{filter\_order-1} hm\_l_b(i) m_b(k-i) \quad \text{MathFigure 31}$$

In this case, k indicates a time order in QMF band, i.e., a timeslot unit. The rendering process executed on the QMF domain is advantageous in that, if spatial information transmitted is a value applicable to the QMF domain, application of corresponding data is most facilitated and that distortion in the course of application can be minimized. Yet, in case of QMF domain conversion in the prototype filter information (e.g., prototype filter coefficient) converting process, a considerable operational quantity is required for a process of applying the converted value. In this case, the operational quantity can be minimized by the method of parameterizing the HRTF coefficient in the filter information converting process.

INDUSTRIAL APPLICABILITY

Accordingly, the signal processing method and apparatus of the present invention uses spatial information provided by an encoder to generate surround signals by using HRTF filter information or filter information according to a user in a decoding apparatus in capable of generating multi-channels. And, the present invention is usefully applicable to various kinds of decoders capable of reproducing stereo signals only.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method of processing a signal, comprising:

generating source mapping information by using spatial information for multi-sources;

generating at least one rendering information by using the source mapping information and filter information for a surround effect;

interpolating the at least one rendering information by using neighbor rendering information of the at least one rendering information; and generating a surround signal having the surround effect by applying the interpolated rendering information to a downmix signal generated by downmixing the multi-sources, wherein the downmix signal includes a left input channel and a right input channel, the surround signal includes a left out channel and a right output channel, the interpolated rendering information comprises a first rendering information and a second rendering information, the first rendering information includes first information for generating the left output channel by applying the first information to the left input channel, and second information for generating the right output channel by applying the second information to the right input channel, and, the second rendering information includes first cross-rendering information for generating the right output channel by applying the first cross-rendering information to the left input channel, and second cross-rendering information for generating the left output channel by applying the second cross-rendering information to the right input channel.

2. The method of claim 1, wherein the interpolating is performed on one of a time domain, a frequency domain, and a QMF domain.

3. The method of claim 1, wherein the interpolating is linearly performed between the neighbor rendering information.

4. The method of claim 1, wherein the interpolating is performed by using at least one of a previous value in specific positions where the at least one rendering information exists, a default value, and a combination of the previous value and the default value.

5. The method of claim 1, further comprising expanding the at least one rendering information from a first frequency band in which the at least one rendering information is generated to a second frequency band.

6. The method of claim 1, wherein the filter information includes at least one of HRTF filter information and a value decided according to a user's selection.

7. An apparatus for processing a signal, comprising:

a source mapping unit generating source mapping information by using spatial information for multi-sources;

an integrating unit generating at least one rendering information by using the source mapping information and filter information for a surround effect;

an interpolating unit interpolating the at least one rendering information by using neighbor rendering information of the at least one rendering information; and a rendering unit generating a surround signal having the surround effect by applying the interpolated rendering information to a downmix signal generated by downmixing the multi-sources, wherein the downmix signal includes a left input channel and a right input channel, the surround signal includes a left out channel and a right output channel, the interpolated rendering information comprises a first rendering information and a second rendering information, the first rendering information includes first information for generating the left output channel by applying the first information to the left input channel, and second information for generating the right output channel by applying the second information to the right input channel, and, the second rendering information includes first cross-rendering information for generating the right output channel by applying the first cross-rendering information to the left input channel, and second cross-rendering information for generating the left output channel by applying the second cross-rendering information to the right input channel.

8. The apparatus of claim 7, wherein the interpolating unit interpolates the at least one rendering information on one of a time domain, a frequency domain, and a QMF domain.

9. The apparatus of claim 7, wherein the interpolating unit interpolates linearly between the neighbor rendering information.

10. The apparatus of claim 7, wherein the interpolating unit interpolates using at least one of a previous value in specific positions where the at least one rendering information exists, a default value, and a combination of the previous value and the default value.

11. The apparatus of claim 7, wherein the interpolating unit expands the at least one rendering information from a first frequency band in which the at least one rendering information is generated to a second frequency band.

12. The apparatus of claim 11, wherein the interpolating unit expands by using a same value as the rendering information in the first frequency band.

13. The apparatus of claim 7, wherein the filter information includes at least one of HRTF filter information and a value decided according to a user's selection.

* * * * *

UNITED STATES PATENT AND TRADEMARK OFFICE

CERTIFICATE OF CORRECTION

PATENT NO. : 8,521,313 B2
APPLICATION NO. : 12/161329
DATED : August 27, 2013
INVENTOR(S) : Oh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1055 days.

Signed and Sealed this
Twenty-fourth Day of March, 2015

Michelle K. Lee
*Director of the United States Patent and Trademark Office*